(12) United States Patent
Biegelsen et al.

(10) Patent No.: US 7,945,346 B2
(45) Date of Patent: May 17, 2011

(54) MODULE IDENTIFICATION METHOD AND SYSTEM FOR PATH CONNECTIVITY IN MODULAR SYSTEMS

(75) Inventors: David K. Biegelsen, Portola Valley, CA (US); Bryan Preas, Palo Alto, CA (US); David G. Duff, Woodside, CA (US); Markus P. J. Fromherz, Palo Alto, CA (US); Craig Eldershaw, Mountain View, CA (US); Lee Ackerson, Ben Lomand, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 1015 days.

(21) Appl. No.: 11/639,073

(22) Filed: Dec. 14, 2006

(65) Prior Publication Data

US 2008/0147234 A1    Jun. 19, 2008

(51) Int. Cl.
G06F 19/00    (2011.01)
(52) U.S. Cl. ...................................... 700/116
(58) Field of Classification Search .......... 700/112–116, 700/215
See application file for complete search history.

(56) References Cited

U.S. PATENT DOCUMENTS

| | | |
|---|---|---|
| 4,579,446 A | 4/1986 | Fujino et al. |
| 4,587,532 A | 5/1986 | Asano |
| 4,836,119 A | 6/1989 | Siraco et al. |
| 5,004,222 A | 4/1991 | Dobashi |
| 5,008,713 A | 4/1991 | Ozawa et al. |
| 5,080,340 A | 1/1992 | Hacknauer et al. |
| 5,095,342 A | 3/1992 | Farrell et al. |
| 5,159,395 A | 10/1992 | Farrell et al. |
| 5,208,640 A | 5/1993 | Horie et al. |
| 5,272,511 A | 12/1993 | Conrad et al. |
| 5,326,093 A | 7/1994 | Sollitt |
| 5,435,544 A | 7/1995 | Mandel |
| 5,473,419 A | 12/1995 | Russel et al. |
| 5,489,969 A | 2/1996 | Soler et al. |

(Continued)

OTHER PUBLICATIONS

Moon, Y.M.; "Chapter 7 Reconfiguration Machine Tool Design"; Jul. 21, 2006; Springer Berlin Heidelberg; pp. 111-139.*

(Continued)

*Primary Examiner* — Albert DeCady
*Assistant Examiner* — Chad Rapp
(74) *Attorney, Agent, or Firm* — Fay Sharpe LLP

(57) ABSTRACT

A configurable self-identifying workpiece transport system is described for moving an associated workpiece relative to a plurality of associated workpiece functional units selectively performing operations on the associated workpiece. The transport system includes a plurality of transport modules and a control unit. The plurality of transport modules are disposed in selected positions relative to the associated workpiece functional units, and each of the plurality of transport modules stores identification data and functionality data specific to the transport module. The control unit includes an automatic identification system in communication with each of the plurality of transport modules for retrieving the identification data and the functionality data from each of the plurality of transport modules and generating an itinerary for moving the associated workpiece relative to the workpiece functional units. Each of the plurality of transport modules includes a local communication circuit adapted to selectively communicate with adjacent transport modules. In one embodiment, the control unit is distributed among the plurality of transport modules and in another embodiment, a global system bus is provided by a central control unit for communicating with each of the plurality of transport modules through the global bus. The local communication circuit includes photo optic devices and the global system bus uses a two wire interface.

33 Claims, 18 Drawing Sheets

U.S. PATENT DOCUMENTS

| | | |
|---|---|---|
| 5,504,568 A | 4/1996 | Saraswat et al. |
| 5,525,031 A | 6/1996 | Fox |
| 5,557,367 A | 9/1996 | Yang et al. |
| 5,568,246 A | 10/1996 | Keller et al. |
| 5,570,172 A | 10/1996 | Acquaviva |
| 5,596,416 A | 1/1997 | Barry et al. |
| 5,629,762 A | 5/1997 | Mahoney et al. |
| 5,710,968 A | 1/1998 | Clark et al. |
| 5,778,377 A | 7/1998 | Marlin et al. |
| 5,884,910 A | 3/1999 | Mandel |
| 5,995,721 A | 11/1999 | Rourke et al. |
| 6,059,284 A | 5/2000 | Wolf et al. |
| 6,125,248 A | 9/2000 | Moser |
| 6,241,242 B1 | 6/2001 | Munro |
| 6,297,886 B1 | 10/2001 | Cornell |
| 6,341,773 B1 | 1/2002 | Aprato et al. |
| 6,384,918 B1 | 5/2002 | Hubble, III et al. |
| 6,450,711 B1 | 9/2002 | Conrow |
| 6,476,376 B1 | 11/2002 | Biegelsen et al. |
| 6,476,923 B1 | 11/2002 | Cornell |
| 6,477,444 B1 | 11/2002 | Bennett, III et al. |
| 6,493,098 B1 | 12/2002 | Cornell |
| 6,537,910 B1 | 3/2003 | Burke et al. |
| 6,550,762 B2 | 4/2003 | Stoll |
| 6,554,276 B2 | 4/2003 | Jackson et al. |
| 6,577,925 B1 | 6/2003 | Fromherz |
| 6,607,320 B2 | 8/2003 | Bobrow et al. |
| 6,608,988 B2 | 8/2003 | Conrow |
| 6,612,566 B2 | 9/2003 | Stoll |
| 6,612,571 B2 | 9/2003 | Rider |
| 6,621,576 B2 | 9/2003 | Tandon et al. |
| 6,633,382 B2 | 10/2003 | Hubble, III et al. |
| 6,639,669 B2 | 10/2003 | Hubble, III et al. |
| 6,725,128 B2 | 4/2004 | Hogg et al. |
| 6,819,906 B1 | 11/2004 | Herrmann et al. |
| 6,925,283 B1 | 8/2005 | Mandel et al. |
| 6,959,165 B2 | 10/2005 | Mandel et al. |
| 6,973,286 B2 | 12/2005 | Mandel et al. |
| 7,024,152 B2 | 4/2006 | Lofthus et al. |
| 7,123,873 B2 | 10/2006 | deJong et al. |
| 7,590,072 B2* | 9/2009 | Radi et al. .................. 370/254 |
| 2002/0078012 A1 | 6/2002 | Ryan et al. |
| 2002/0103559 A1 | 8/2002 | Gartstein |
| 2003/0077095 A1 | 4/2003 | Conrow |
| 2004/0085561 A1 | 5/2004 | Fromherz |
| 2004/0085562 A1 | 5/2004 | Fromherz |
| 2004/0088207 A1 | 5/2004 | Fromherz |
| 2004/0150156 A1 | 8/2004 | Fromherz et al. |
| 2004/0150158 A1 | 8/2004 | Biegelsen et al. |
| 2004/0153983 A1 | 8/2004 | McMillan |
| 2004/0216002 A1 | 10/2004 | Fromherz et al. |
| 2004/0225391 A1 | 11/2004 | Fromherz et al. |
| 2004/0225394 A1 | 11/2004 | Fromherz et al. |
| 2004/0247365 A1 | 12/2004 | Lofthus et al. |
| 2006/0033771 A1 | 2/2006 | Lofthus et al. |
| 2006/0066885 A1 | 3/2006 | Anderson et al. |
| 2006/0067756 A1 | 3/2006 | Anderson et al. |
| 2006/0067757 A1 | 3/2006 | Anderson et al. |
| 2006/0068666 A1* | 3/2006 | Sharma et al. .................. 442/327 |
| 2006/0114313 A1 | 6/2006 | Moore |
| 2006/0114497 A1 | 6/2006 | Anderson et al. |
| 2006/0115284 A1 | 6/2006 | Grace et al. |
| 2006/0115287 A1 | 6/2006 | Roof |
| 2006/0115288 A1 | 6/2006 | Roof |
| 2006/0132815 A1 | 6/2006 | Lofthus et al. |
| 2006/0176336 A1 | 8/2006 | Moore et al. |
| 2006/0197966 A1 | 9/2006 | Viturro et al. |
| 2006/0209101 A1 | 9/2006 | Mizes |
| 2006/0214359 A1 | 9/2006 | Clark |
| 2006/0214364 A1 | 9/2006 | Clark et al. |
| 2006/0215240 A1 | 9/2006 | Mongeon |
| 2006/0221159 A1 | 10/2006 | Moore et al. |
| 2006/0221362 A1 | 10/2006 | Julien et al. |
| 2006/0222378 A1 | 10/2006 | Julien |
| 2006/0222384 A1 | 10/2006 | Moore et al. |
| 2006/0222393 A1 | 10/2006 | de Jong et al. |
| 2006/0227350 A1 | 10/2006 | Crawford et al. |
| 2006/0230201 A1 | 10/2006 | Fromherz et al. |
| 2006/0230403 A1 | 10/2006 | Crawford et al. |
| 2006/0233569 A1 | 10/2006 | Furst et al. |
| 2006/0235547 A1 | 10/2006 | Hindi et al. |
| 2006/0238778 A1 | 10/2006 | Mongeon et al. |
| 2006/0244980 A1 | 11/2006 | Grace |
| 2006/0250636 A1* | 11/2006 | Richards .................. 358/1.15 |
| 2007/0094410 A1* | 4/2007 | Voigt et al. .................. 709/237 |

OTHER PUBLICATIONS

Koren et al.; "Reconfurable Manufactruing Systems"; 1999; Keynote Pepers; Annuals of the CIRP; vol. 48; pp. 527-540.*
Morgan, P.F., "Integration of Black Only and Color Printers", Xerox Disclosure Journal, vol. 16, No. 6, Nov./Dec. 1991, pp. 381-383.
Desmond Fretz, "Cluster Printing Solution Announced", Today at Xerox (TAX), No. 1129, Aug. 3, 2001.
U.S. Appl. No. 10/785,211, filed Feb. 24, 2004, Lofthus et al.
U.S. Appl. No. 10/881,619, filed Jun. 30, 2004, Bobrow.
U.S. Appl. No. 10/917,676, filed Aug. 13, 2004, Lofthus et al.
U.S. Appl. No. 10/924,458, filed Aug. 23, 2004, Lofthus et al.
U.S. Appl. No. 10/924,459, filed Aug. 23, 2004, Mandel et al.
U.S. Appl. No. 10/933,556, filed Sep. 3, 2004, Spencer et al.
U.S. Appl. No. 10/953,953, filed Sep. 29, 2004, Radulski et al.
U.S. Appl. No. 10/999,450, filed Nov. 30, 2004, Lofthus et al.
U.S. Appl. No. 11/000,168, filed Nov. 30, 2004, Biegelsen et al.
U.S. Appl. No. 11/109,566, filed Apr. 19, 2005, Mandel et al.
U.S. Appl. No. 11/136,959, filed May 25, 2005, German et al.
U.S. Appl. No. 11/137,634, filed May 25, 2005, Lofthus et al.
U.S. Appl. No. 11/137,251, filed May 25, 2005, Lofthus et al.
U.S. Appl. No. 11/152,275, filed Jun. 14, 2005, Roof et al.
U.S. Appl. No. 11/156,778, filed Jun. 20, 2005, Swift.
U.S. Appl. No. 11/157,598, filed Jun. 21, 2005, Frankel.
U.S. Appl. No. 11/143,818, filed Jun. 2, 2005, Dalal et al.
U.S. Appl. No. 11/146,665, filed Jun. 7, 2005, Mongeon.
U.S. Appl. No. 11/166,299, filed Jun. 24, 2005, Moore.
U.S. Appl. No. 11/166,460, filed Jun. 24, 2005, Roof et al.
U.S. Appl. No. 11/166,581, filed Jun. 24, 2005, Lang et al.
U.S. Appl. No. 11/170,873, filed Jun. 30, 2005, Klassen.
U.S. Appl. No. 11/170,975, filed Jun. 30, 2005, Klassen.
U.S. Appl. No. 11/170,845, filed Jun. 30, 2005, Sampath et al.
U.S. Appl. No. 11/189,371, filed Jul. 26, 2005, Moore et al.
U.S. Appl. No. 11/208,871, filed Aug. 22, 2005, Dalal et al.
U.S. Appl. No. 11/215,791, filed Aug. 30, 2005, Hamby et al.
U.S. Appl. No. 11/234,468, filed Sep. 23, 2005, Hamby et al.
U.S. Appl. No. 11/234,553, filed Sep. 23, 2005, Mongeon.
U.S. Appl. No. 11/222,260, filed Sep. 8, 2005, Goodman et al.
U.S. Appl. No. 11/247,778, filed Oct. 11, 2005, Radulski et al.
U.S. Appl. No. 11/248,044, filed Oct. 12, 2005, Spencer et al.
U.S. Appl. No. 11/287,177, filed Nov. 23, 2005, Mandel et al.
U.S. Appl. No. 11/291,583, filed Nov. 30, 2005, Lang.
U.S. Appl. No. 11/291,860, filed Nov. 30, 2005, Willis.
U.S. Appl. No. 11/274,638, filed Nov. 15, 2005, Wu et al.
U.S. Appl. No. 11/287,685, filed Nov. 28, 2005, Carolan.
U.S. Appl. No. 11/317,589, filed Dec. 23, 2005, Biegelsen et al.
U.S. Appl. No. 11/314,774, filed Dec. 21, 2005, Klassen.
U.S. Appl. No. 11/317,167, filed Dec. 23, 2005, Lofthus et al.
U.S. Appl. No. 11/314,828, filed Dec. 21, 2005, Anderson et al.
U.S. Appl. No. 11/292,388, filed Nov. 30, 2005, Mueller.
U.S. Appl. No. 11/292,163, filed Nov. 30, 2005, Mandel et al.
U.S. Appl. No. 11/312,081, filed Dec. 20, 2005, Mandel et al.
U.S. Appl. No. 11/331,627, filed Jan. 13, 2006, Moore.
U.S. Appl. No. 11/341,733, filed Jan. 27, 2006, German.
U.S. Appl. No. 11/359,065, filed Feb. 22, 2005, Banton.
U.S. Appl. No. 11/349,828, filed Feb. 8, 2006, Banton.
U.S. Appl. No. 11/364,685, filed Feb. 28, 2006, Hindi et al.
U.S. Appl. No. 11/363,378, filed Feb. 27, 2006, Anderson et al.
U.S. Appl. No. 11/378,046, filed Mar. 17, 2006, Rizzolo et al.
U.S. Appl. No. 11/378,040, filed Mar. 17, 2006, German.
U.S. Appl. No. 11/403,785, filed Apr. 13, 2006, Banton et al.
U.S. Appl. No. 11/399,100, filed Apr. 6, 2006, Paul.
U.S. Appl. No. 11/417,411, filed May 4, 2006, DeGruchy.
U.S. Appl. No. 11/432,924, filed May 12, 2006, Lieberman et al.
U.S. Appl. No. 11/432,905, filed May 12, 2006, Mongeon et al.
U.S. Appl. No. 11/432,993, filed May 12, 2006, Anderson.

U.S. Appl. No. 11/487,206, filed Jul. 14, 2006, Wu et al.
U.S. Appl. No. 11/485,870, filed Jul. 13, 2006, Moore.
U.S. Appl. No. 11/474,247, filed Jun. 23, 2006, Moore.
U.S. Appl. No. 11/483,747, filed Jul. 6, 2006, Meetze.
U.S. Appl. No. 11/495,017, filed Jul. 28, 2006, Bean.
U.S. Appl. No. 11/501,654, filed Aug. 9, 2006, Mestha et al.
U.S. Appl. No. 11/522,171, filed Sep. 15, 2006, Sampath et al.
U.S. Appl. No. 11/528,770, filed Sep. 27, 2006, Degruchy.
U.S. Appl. No. 11/545,176, filed Oct. 10, 2006, deJong et al.
U.S. Appl. No. 11/595,630, filed Nov. 9, 2006, Moore.
U.S. Appl. No. 11/590,432, filed Oct. 31, 2006, Moore.

* cited by examiner

| ID 210 | MNEMONIC/TYPE 212 | PORTS 214 | FUNCTIONAL CAPABILITY ROUTING 216 | FUNCTIONAL CAPABILITY OTHER 218 |
|---|---|---|---|---|
| 001 | T BI-DIR | A<br>B<br>C | A<->B<br>A<->C<br>B<->C | GATE SWITCH SPEED: 10MS<br>MAX SPEED: 2 M/S<br>MAX ARC: 10 M/S/S |
| 002<br>003<br>004 | NIP<br>NIP<br>NIP | A,B<br>A,B<br>A,B | A<->B<br>A<->B<br>A<->B | OTHER<br>MAX SPEED: 2 M/S<br>MAX ARC: 10 M/S/S |
| 005<br>006 | LINEAR BI<br>NIP | A,B<br>A,B | A<->B<br>A<->B | GATE SWITCH SPEED: 10MS<br>MAX SPEED: 2 M/S<br>MAX ARC: 10 M/S/S |
| 007<br>008 | LINEAR UNI-DIR<br>NIP | A,B<br>A,B | A->B<br>A->B | GATE SWITCH SPEED: 10MS<br>MAX SPEED: 2 M/S<br>MAX ARC: 10 M/S/S |
| 009<br>010 | LINEAR BI-DIR<br>NIP | A,B<br>A,B | A<->B<br>A<->B | GATE SWITCH SPEED: 10MS<br>MAX SPEED: 2 M/S<br>MAX ARC: 10 M/S/S |

FIG. 8

| LINK LIST ||
|---|---|
| FROM ⟶ | TO |
| (001, A) | (002, B) |
| (001, B) | (003, A) |
| (001, C) | (004, A) |
| (002, A) | (005, B) |
| (002, B) | (001, A) |
| (003, A) | (001, B) |
| (003, B) | (009, B) |
| (004, A) | (001, C) |
| (004, B) | (007, A) |
| (005, A) | (006, B) |
| (005, B) | (002, A) |
| (006, A) | X     OPEN |
| (006, B) | (005, A) |
| (007, A) | (004, B) |
| (007, B) | (008, A) |
| (008, A) | (007, B) |
| (008, B) | X     OPEN |
| (009, A) | (010, B) |
| (009, B) | (003, B) |
| (010, A) | X     OPEN |
| (010, B) | (009, A) |

FIG. 9

MODULE IDENTIFICATION METHOD AND SYSTEM FOR PATH CONNECTIVITY IN MODULAR SYSTEMS

BACKGROUND

The present exemplary embodiments relate to the interconnection of multiple sheet functional entities such as printers, feeders, finishers, and the like using a plurality of interconnected sheet transport modules connecting the sheet functional entities. In particular, the embodiments relate to methods and apparatus for providing automated identification between the multiple sheet transport modules as a group and communication between the group of modules with each other and selectively with a supervisory host for simplifying, by automating, the steps to be taken when additional transport modules are to be added to the collection and/or modules are rearranged or removed therefrom. The embodiments relate to individual sheet transfer modules, to the collection of sheet transfer modules in sets or systems, to a supervisory host in operative communication with the set of modules using a centralized control, and to a collection of sheet transport modules interoperable without a supervisory host using a decentralized control. It is to be appreciated, however, that the present exemplary embodiments are also amenable to applications other than sheet transport modules and are useful in any reconfigurable modular system for a wide variety of environments, uses, and applications such as in other material processing or handling systems arranged in a modular path topology.

In a conventional printing apparatus, sheet material or paper is handled by a series of sheet guides, rollers, and counter rollers forming nips and the like, arranged along a paper path. Similarly, guides, rollers, and nips form paper paths through other sheet functional entities such as feeders, finishers, collators, and the like. For paper paths extending between several sheet functional entities, transport modules are provided for interconnecting the sheet functional entities and for providing a suitable paper path therebetween as desired based upon the needs of the application.

Simple sheet processing systems include a pair of spaced apart sheet functional entities interconnected by means of one or more modular sheet transport modules. The sheet functional entities might typically include a single printer interconnected with a sheet finisher. This system is primarily a single dimensional chain of functional units and, therefore, can be readily assembled and is easily maintainable.

However, in a tightly integrated parallel processing system including two or more sheet functional entities interconnected by a two or more dimensional chain of transport modules, the assembly and maintenance of the overall system becomes difficult. It is to be appreciated that systems of this type are intended to be readily composable and re-composable into a large variety of configurations as needed. It is important to hide the complexity of such systems while assisting the manufacturer and end user in the assembly and analysis of these systems.

Further, in complicated hypermodular tightly integrated parallel processing systems, high level controllers and sheet path planning processors must readily appreciate the logical and functional interconnections between all of the elements in the system in order to properly control the flow of material, such as sheets, through the system. However, bus communication alone between entities does not provide physical positional information so a controller cannot infer the physical links in the sheet path. Another means is necessary, therefore, to allow the topological paths to be determined. Manual inputs of the linkages to a database is possible but cumbersome and error prone. Also a manual linkage update would be needed each time the entities are reorganized or modified in any way.

Therefore, there is a need in the art for an automated method and system to enable a self-identification of the modules within the system as well as a self-identification of system layout and of the interconnections between the many transport modules connecting the many sheet functional entities within the hypermodular tightly integrated parallel processing system.

The present embodiments provide methods, apparatus, and systems for automatic self-identification of the system layout and functionality between the sheet transport modules forming a system for automatic generation of workpiece processing itineraries.

CROSS REFERENCE TO RELATED PATENTS AND APPLICATIONS

The following patents/applications, the disclosures of each being totally incorporated herein by reference are mentioned:

U.S. Publication No. US-2006-0114497-A1, Published Jun. 1, 2006, entitled "PRINTING SYSTEM," by David G. Anderson, et al., and claiming priority to U.S. Provisional Application Ser. No. 60/631,651, filed Nov. 30, 2004, entitled "TIGHTLY INTEGRATED PARALLEL PRINTING ARCHITECTURE MAKING USE OF COMBINED COLOR AND MONOCHROME ENGINES";

U.S. Publication No. US-2006-0067756-A1, filed Sep. 27, 2005, entitled "PRINTING SYSTEM," by David G. Anderson, et al., and claiming priority to U.S. Provisional Patent Application Ser. No. 60/631,918, filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Publication No. US-2006-0067757-A1, filed Sep. 27, 2005, entitled "PRINTING SYSTEM," by David G. Anderson, et al., and claiming priority to U.S. Provisional Patent Application Ser. No. 60/631,918, Filed Nov. 30, 2004, entitled "PRINTING SYSTEM WITH MULTIPLE OPERATIONS FOR FINAL APPEARANCE AND PERMANENCE," and U.S. Provisional Patent Application Ser. No. 60/631,921, filed Nov. 30, 2004, entitled "PRINTING SYSTEM WITH MULTIPLE OPERATIONS FOR FINAL APPEARANCE AND PERMANENCE";

U.S. Pat. No. 6,973,286, issued Dec. 6, 2005, entitled "HIGH RATE PRINT MERGING AND FINISHING SYSTEM FOR PARALLEL PRINTING," by Barry P. Mandel, et al.;

U.S. application Ser. No. 10/785,211, filed Feb. 24, 2004, entitled "UNIVERSAL FLEXIBLE PLURAL PRINTER TO PLURAL FINISHER SHEET INTEGRATION SYSTEM," by Robert M. Lofthus, et al.;

U.S. Application No. US-2006-0012102-A1, published Jan. 19, 2006, entitled "FLEXIBLE PAPER PATH USING MULTIDIRECTIONAL PATH MODULES," by Daniel G. Bobrow;

U.S. application Ser. No. 10/917,676, filed Aug. 13, 2004, entitled "MULTIPLE OBJECT SOURCES CONTROLLED AND/OR SELECTED BASED ON A COMMON SENSOR," by Robert M. Lofthus, et al.;

U.S. Publication No. US-2006-0033771-A1, published Feb. 16, 2006, entitled "PARALLEL PRINTING ARCHI- TECTURE CONSISTING OF CONTAINERIZED IMAGE MARKING ENGINES AND MEDIA FEEDER MODULES," by Robert M. Lofthus, et al.;

U.S. Pat. No. 7,924,152, issued Apr. 4, 2006, entitled "PRINTING SYSTEM WITH HORIZONTAL HIGHWAY AND SINGLE PASS DUPLEX," by Robert M. Lofthus, et al.;

U.S. Pat. No. 7,123,873, issued Oct. 17, 2006, entitled "PRINTING SYSTEM WITH INVERTER DISPOSED FOR MEDIA VELOCITY BUFFERING AND REGISTRATION," by Joannes N. M. deJong, et al.;

U.S. application Ser. No. 10/924,458, filed Aug. 23, 2004, entitled "PRINT SEQUENCE SCHEDULING FOR RELIABILITY," by Robert M. Lofthus, et al.;

U.S. Publication No. US-2006-0039729-A1, published Feb. 23, 2006, entitled "PARALLEL PRINTING ARCHITECTURE USING IMAGE MARKING ENGINE MODULES (as amended)," by Barry P. Mandel, et al.;

U.S. Pat. No. 6,959,165, issued Oct. 25, 2005, entitled "HIGH RATE PRINT MERGING AND FINISHING SYSTEM FOR PARALLEL PRINTING," by Barry P. Mandel, et al.;

U.S. application Ser. No. 10/933,556, filed Sep. 3, 2004, entitled "SUBSTRATE INVERTER SYSTEMS AND METHODS," by Stan A. Spencer, et al.;

U.S. application Ser. No. 10/953,953, filed Sep. 29, 2004, entitled "CUSTOMIZED SET POINT CONTROL FOR OUTPUT STABILITY IN A TIPP ARCHITECTURE," by Charles A. Radulski, et al.;

U.S. Publication No. US-2006-0115284-A1, Published Jun. 1, 2006, entitled "SEMI-AUTOMATIC IMAGE QUALITY ADJUSTMENT FOR MULTIPLE MARKING ENGINE SYSTEMS," by Robert E. Grace, et al.;

U.S. application Ser. No. 10/999,450, filed Nov. 30, 2004, entitled "ADDRESSABLE FUSING FOR AN INTEGRATED PRINTING SYSTEM," by Robert M. Lofthus, et al.;

U.S. Publication No. US-2006-0115287-A1, Published Jun. 1, 2006, entitled "GLOSSING SYSTEM FOR USE IN A TIPP ARCHITECTURE," by Bryan J. Roof;

U.S. application Ser. No. 11/000,168, filed Nov. 30, 2004, entitled "ADDRESSABLE FUSING AND HEATING METHODS AND APPARATUS," by David K. Biegelsen, et al.;

U.S. Publication No. US-2006-0115288-A1, Published Jun. 1, 2006, entitled "GLOSSING SYSTEM FOR USE IN A TIPP ARCHITECTURE," by Bryan J. Roof;

U.S. Pat. No. 6,925,283, issued Aug. 2, 2005, entitled "HIGH PRINT RATE MERGING AND FINISHING SYSTEM FOR PARALLEL PRINTING," by Barry P. Mandel, et al.;

U.S. Publication No. US-2006-0176336-A1, Published Aug. 10, 2006, entitled "PRINTING SYSTEMS," by Steven R. Moore, et al.;

U.S. Publication No. US-2006-0132815-A1, Published Jun. 22, 2006, entitled "PRINTING SYSTEMS," by Robert M. Lofthus, et al.;

U.S. Publication No. US-2006-0197966-A1, Published Sep. 7, 2006, entitled "GRAY BALANCE FOR A PRINTING SYSTEM OF MULTIPLE MARKING ENGINES," by R. Enrique Viturro, et al.;

U.S. Publication No. US-2006-0114313-A1, Published Jun. 1, 2006, entitled "PRINTING SYSTEM," by Steven R. Moore;

U.S. Publication No. US-2006-0209101-A1, Published Sep. 21, 2006, entitled "SYSTEMS AND METHODS FOR MEASURING UNIFORMITY IN IMAGES," by Howard Mizes;

U.S. Publication No. US-2006-0214364-A1, Published Sep. 28, 2006, entitled "SHEET REGISTRATION WITHIN A MEDIA INVERTER," by Robert A. Clark, et al.;

U.S. Publication No. US-2006-0214359-A1, Published Sep. 28, 2006, entitled "INVERTER WITH RETURN/BYPASS PAPER PATH," by Robert A. Clark;

U.S. Publication No. 20031468-US-NP, Published Sep. 28, 2006, entitled "IMAGE QUALITY CONTROL METHOD AND APPARATUS FOR MULTIPLE MARKING ENGINE SYSTEMS," by Michael C. Mongeon;

U.S. Publication No. US-2006-0222378-A1, Published Oct. 5, 2006, entitled "PRINTING SYSTEM," by Paul C. Julien;

U.S. Publication No. US-2006-0221362-A1, Published Oct. 5, 2006, entitled "PRINTING SYSTEM," by Paul C. Julien;

U.S. Publication No. US-2006-0222393-A1, Published Oct. 5, 2006, entitled "PRINTING SYSTEM," by Jeremy C. deJong, et al.;

U.S. Publication No. US-2006-0222384-A1, Published Oct. 5, 2006, entitled "IMAGE ON PAPER REGISTRATION ALIGNMENT," by Steven R. Moore, et al.;

U.S. Publication No. US-2006-0221159-A1, Published Oct. 5, 2006, entitled "PARALLEL PRINTING ARCHITECTURE WITH PARALLEL HORIZONTAL PRINTING MODULES," by Steven R. Moore, et al.;

U.S. Publication No. US-2006-0227350-A1, Published Oct. 12, 2006, entitled "SYNCHRONIZATION IN A DISTRIBUTED SYSTEM," by Lara S. Crawford, et al.;

U.S. Publication No. US-2006-0230403-A1, Published Oct. 12, 2006, entitled "COORDINATION IN A DISTRIBUTED SYSTEM," by Lara S. Crawford, et al.;

U.S. Publication No. US-2006-0230201-A1, Published Oct. 12, 2006, entitled "COMMUNICATION IN A DISTRIBUTED SYSTEM," by Markus P. J. Fromherz, et al.;

U.S. Publication No. US-2006-0235547-A1, published Oct. 19, 2006, entitled "ON-THE-FLY STATE SYNCHRONIZATION IN A DISTRIBUTED SYSTEM," by Haitham A. Hindi;

U.S. Publication No. US-2006-0233569-A1, filed Oct. 19, 2006, entitled "SYSTEMS AND METHODS FOR REDUCING IMAGE REGISTRATION ERRORS," by Michael R. Furst, et al.;

U.S. application Ser. No. 11/109,566, filed Apr. 19, 2005, entitled "MEDIA TRANSPORT SYSTEM," by Barry P. Mandel, et al.;

U.S. Publication No. US-2006-0238778-A1, Published Oct. 26, 2006, entitled "PRINTING SYSTEMS," by Michael C. Mongeon, et al.;

U.S. Publication No. US-2006-0244980-A1, Filed Apr. 27, 2005, entitled "IMAGE QUALITY ADJUSTMENT METHOD AND SYSTEM," by Robert E. Grace;

U.S. Publication No. US-2006-0250636-A1, published Nov. 9, 2006, entitled "PRINTING SYSTEM AND SCHEDULING METHOD," by Austin L. Richards;

U.S. application Ser. No. 11/136,959, filed May 25, 2005, entitled "PRINTING SYSTEMS," by Kristine A. German, et al.;

U.S. application Ser. No. 11/137,634, filed May 25, 2005, entitled "PRINTING SYSTEM," by Robert M. Lofthus, et al.;

U.S. application Ser. No. 11/137,251, filed May 25, 2005, entitled "SCHEDULING SYSTEM," by Robert M. Lofthus, et al.;

U.S. Publication No. US-2006-0066885-A1, filed May 25, 2005, entitled "PRINTING SYSTEM," by David G. Anderson, et al.;

U.S. application Ser. No. 11/143,818, filed Jun. 2, 2005, entitled "INTER-SEPARATION DECORRELATOR," by Edul N. Dalal, et al.;

U.S. application Ser. No. 11/146,665, filed Jun. 7, 2005, entitled "LOW COST ADJUSTMENT METHOD FOR PRINTING SYSTEMS," by Michael C. Mongeon;

U.S. application Ser. No. 11/152,275, filed Jun. 14, 2005, entitled "WARM-UP OF MULTIPLE INTEGRATED MARKING ENGINES," by Bryan J. Roof, et al.;

U.S. application Ser. No. 11/156,778, filed Jun. 20, 2005, entitled "PRINTING PLATFORM," by Joseph A. Swift;

U.S. application Ser. No. 11/157,598, filed Jun. 21, 2005, entitled "METHOD OF ORDERING JOB QUEUE OF MARKING SYSTEMS," by Neil A. Frankel;

U.S. application Ser. No. 11/166,460, filed Jun. 24, 2005, entitled "GLOSSING SUBSYSTEM FOR A PRINTING DEVICE," by Bryan J. Roof, et al.;

U.S. application Ser. No. 11/166,581, filed Jun. 24, 2005, entitled "MIXED OUTPUT PRINT CONTROL METHOD AND SYSTEM," by Joseph H. Lang, et al.;

U.S. application Ser. No. 11/166,299, filed Jun. 24, 2005, entitled "PRINTING SYSTEM," by Steven R. Moore;

U.S. application Ser. No. 11/170,975, filed Jun. 30, 2005, entitled "METHOD AND SYSTEM FOR PROCESSING SCANNED PATCHES FOR USE IN IMAGING DEVICE CALIBRATION," by R. Victor Klassen;

U.S. application Ser. No. 11/170,873, filed Jun. 30, 2005, entitled "COLOR CHARACTERIZATION OR CALIBRATION TARGETS WITH NOISE-DEPENDENT PATCH SIZE OR NUMBER," by R. Victor Klassen;

U.S. application Ser. No. 11/170,845, filed Jun. 30, 2005, entitled "HIGH AVAILABILITY PRINTING SYSTEMS," by Meera Sampath, et al.;

U.S. application Ser. No. 11/189,371, filed Jul. 26, 2005, entitled "PRINTING SYSTEM," by Steven R. Moore, et al.;

U.S. application Ser. No. 11/208,871, filed Aug. 22, 2005, entitled "MODULAR MARKING ARCHITECTURE FOR WIDE MEDIA PRINTING PLATFORM," by Edul N. Dalal, et al.;

U.S. application Ser. No. 11/215,791, filed Aug. 30, 2005, entitled "CONSUMABLE SELECTION IN A PRINTING SYSTEM," by Eric Hamby, et al.;

U.S. application Ser. No. 11/222,260, filed Sep. 8, 2005, entitled "METHOD AND SYSTEMS FOR DETERMINING BANDING COMPENSATION PARAMETERS IN PRINTING SYSTEMS," by Goodman, et al.;

U.S. application Ser. No. 11/234,553, filed Sep. 23, 2005, entitled "MAXIMUM GAMUT STRATEGY FOR THE PRINTING SYSTEMS," by Michael C. Mongeon;

U.S. application Ser. No. 11/234,468, filed Sep. 23, 2005, entitled "PRINTING SYSTEM," by Eric Hamby, et al.;

U.S. application Ser. No. 11/247,778, filed Oct. 11, 2005, entitled "PRINTING SYSTEM WITH BALANCED CONSUMABLE USAGE," by Charles Radulski, et al.;

U.S. application Ser. No. 11/248,044, filed Oct. 12, 2005, entitled "MEDIA PATH CROSSOVER FOR PRINTING SYSTEM," by Stan A. Spencer, et al.; and U.S. application Ser. No. 11/274,638, filed Nov. 15, 2005, entitled "GAMUT SELECTION IN MULTI-ENGINE SYSTEMS," by Wencheng Wu, et al.;

U.S. application Ser. No. 11/287,177, filed Nov. 23, 2005, entitled "MEDIA PASS THROUGH MODE FOR MULTI-ENGINE SYSTEM," by Barry P. Mandel, et al.;

U.S. application Ser. No. 11/287,685, filed Nov. 28, 2005, entitled "MULTIPLE IOT PPHOTORECEPTOR BELT SEAM SYNCHRONIZATION," by Kevin M. Carolan;

U.S. application Ser. No. 11/291,860, filed Nov. 30, 2005, entitled "MEDIA PATH CROSSOVER CLEARANCE FOR PRINTING SYSTEM," by Keith L. Willis;

U.S. application Ser. No. 11/292,388, filed Nov. 30, 2005, entitled "PRINTING SYSTEM," by David A. Mueller;

U.S. application Ser. No. 11/292,163, filed Nov. 30, 2005, entitled "RADIAL MERGE MODULE FOR PRINTING SYSTEM," by Barry P. Mandel, et al.;

U.S. application Ser. No. 11/291,583, filed Nov. 30, 2005, entitled "MIXED OUTPUT PRINTING SYSTEM," by Joseph H. Lang;

U.S. application Ser. No. 11/312,081, filed Dec. 20, 2005, entitled "PRINTING SYSTEM ARCHITECTURE WITH CENTER CROSS-OVER AND INTERPOSER BY-PASS PATH," by Barry P. Mandel, et al.;

U.S. application Ser. No. 11/314,828, filed Dec. 21, 2005, entitled "MEDIA PATH DIAGNOSTICS WITH HYPER MODULE ELEMENTS," by David G. Anderson, et al;

U.S. application Ser. No. 11/314,774, filed Dec. 21, 2005, entitled "METHOD AND APPARATUS FOR MULTIPLE PRINTER CALIBRATION USING COMPROMISE AIM," by R. Victor Klassen;

U.S. application Ser. No. 11/317,589, filed Dec. 23, 2005, entitled "UNIVERSAL VARIABLE PITCH INTERFACE INTERCONNECTING FIXED PITCH SHEET PROCESSING MACHINES," by David K. Biegelsen, et al.;

U.S. application Ser. No. 11/317,167, filed Dec. 23, 2005, entitled "PRINTING SYSTEM," by Robert M. Lofthus, et al.;

U.S. application Ser. No. 11/331,627, filed Jan. 13, 2006, entitled "PRINTING SYSTEM INVERTER APPARATUS", by Steven R. Moore;

U.S. application Ser. No. 11/341,733, filed Jan. 27, 2006, entitled "PRINTING SYSTEM AND BOTTLENECK OBVIATION", by Kristine A. German;

U.S. application Ser. No. 11/349,828, filed Feb. 8, 2005, entitled "MULTI-DEVELOPMENT SYSTEM PRINT ENGINE", by Martin E. Banton;

U.S. application Ser. No. 11/359,065, filed Feb. 22, 2005, entitled "MULTI-MARKING ENGINE PRINTING PLATFORM", by Martin E. Banton;

U.S. application Ser. No. 11/363,378, filed Feb. 27, 2006, entitled "SYSTEM FOR MASKING PRINT DEFECTS", by Anderson, et al.;

U.S. application Ser. No. 11/364,685, filed Feb. 28, 2006, entitled "SYSTEM AND METHOD FOR MANUFACTURING SYSTEM DESIGN AND SHOP SCHEDULING USING NETWORK FLOW MODELING", by Hindi, et al.;

U.S. application Ser. No. 11/378,046, filed Mar. 17, 2006, entitled "PAGE SCHEDULING FOR PRINTING ARCHITECTURES", by Charles D. Rizzolo, et al.;

U.S. application Ser. No. 11/378,040, filed Mar. 17, 2006, entitled "FAULT ISOLATION OF VISIBLE DEFECTS WITH MANUAL MODULE SHUTDOWN OPTIONS", by Kristine A. German, et al.;

U.S. application Ser. No. 11/399,100, filed Apr. 6, 2006, entitled "SYSTEMS AND METHODS TO MEASURE BANDING PRINT DEFECTS", by Peter Paul;

U.S. application Ser. No. 11/403,785, filed Apr. 13, 2006, entitled "MARKING ENGINE SELECTION", by Martin E. Banton et al.;

U.S. application Ser. No. 11/417,411, filed May 4, 2006, entitled "DIVERTER ASSEMBLY, PRINTING SYSTEM AND METHOD", by Paul J. Degruchy;

U.S. application Ser. No. 11/432,993, filed May 12, 2006, entitled "TONER SUPPLY ARRANGEMENT", by David G. Anderson;

U.S. application Ser. No. 11/432,924, filed May 12, 2006, entitled "AUTOMATIC IMAGE QUALITY CONTROL OF MARKING PROCESSES", by David J. Lieberman;

U.S. application Ser. No. 11/432,905, filed May 12, 2006, entitled "PROCESS CONTROLS METHODS AND APPARATUSES FOR IMPROVED IMAGE CONSISTENCY", by Michael C. Mongeon et al.;

U.S. application Ser. No. 11/474,247, filed Jun. 23, 2006, entitled "CONTINUOUS FEED PRINTING SYSTEM", by Steven R. Moore;

U.S. application Ser. No. 11/483,747, filed Jul. 6, 2006, entitled "POWER REGULATOR OF MULTIPLE MARKING ENGINES", by Murray O. Meetze, Jr.;

U.S. application Ser. No. 11/485,870, filed Jul. 13, 2006, entitled "PARALLEL PRINTING SYSTEM", by Steven R. Moore;

U.S. application Ser. No. 11/487,206, filed Jul. 14, 2006, entitled "BANDING AND STREAK DETECTION USING CUSTOMER DOCUMENTS", by Wencheng Wu, et al.;

U.S. application Ser. No. 11/495,017, filed Jul. 28, 2006, entitled "SYSTEM AND METHOD FOR PARTIAL JOB INTERRUPT OF NORMAL ORDER OF JOB QUEUE OF MARKING SYSTEMS", by Lloyd F. Bean, II;

U.S. application Ser. No. 11/501,654, filed Aug. 9, 2006, entitled "METHOD FOR SPATIAL COLOR CALIBRATION USING HYBRID SENSING SYSTEMS", by Lalit Keshav Mestha et al.;

U.S. application Ser. No. 11/522,171, filed Sep. 15, 2006, entitled "FAULT MANAGEMENT FOR A PRINTING SYSTEM", by Meera Sampath, et al.;

U.S. application Ser. No. 11/528,770, filed Sep. 27, 2006, entitled "SHEET BUFFERING SYSTEM", by Paul DeGruchy;

U.S. application Ser. No. 11/545,176, filed Oct. 10, 2006, entitled "PRINTING SYSTEM WITH INVERTER DISPOSED FOR MEDIA VELOCITY BUFFERING AND REGISTRATION", by Joannes N. M. Dejong et al.

U.S. application Ser. No. 11/590,432, filed Oct. 31, 2006, entitled "SHAFT DRIVING APPARATUS", by Steven R. Moore;

U.S. application Ser. No. 11/595,630, filed Nov. 9, 2006, entitled "PRINT MEDIA ROTARY TRANSPORT APPARATUS AND METHOD", by Steven R. Moore;

U.S. application Ser. No. 11/626,901, filed Dec. 11, 2006, entitled "DATA BINDING IN MULTIPLE MARKING ENGINE PRINTING SYSTEMS BACKGROUND", by Martin E. Banton et al.

BRIEF DESCRIPTION OF THE DRAWINGS

FIG. 8 shows a module function table used in the system of FIGS. 1 and 2 and containing data representative of the assembly of the modules in FIG. 7 by way of example;

FIG. 9 is a link list table used by the system of FIGS. 1 and 2 and illustrating by way of example data of the assembly of FIG. 7;

DETAILED DESCRIPTION

Figure 1:
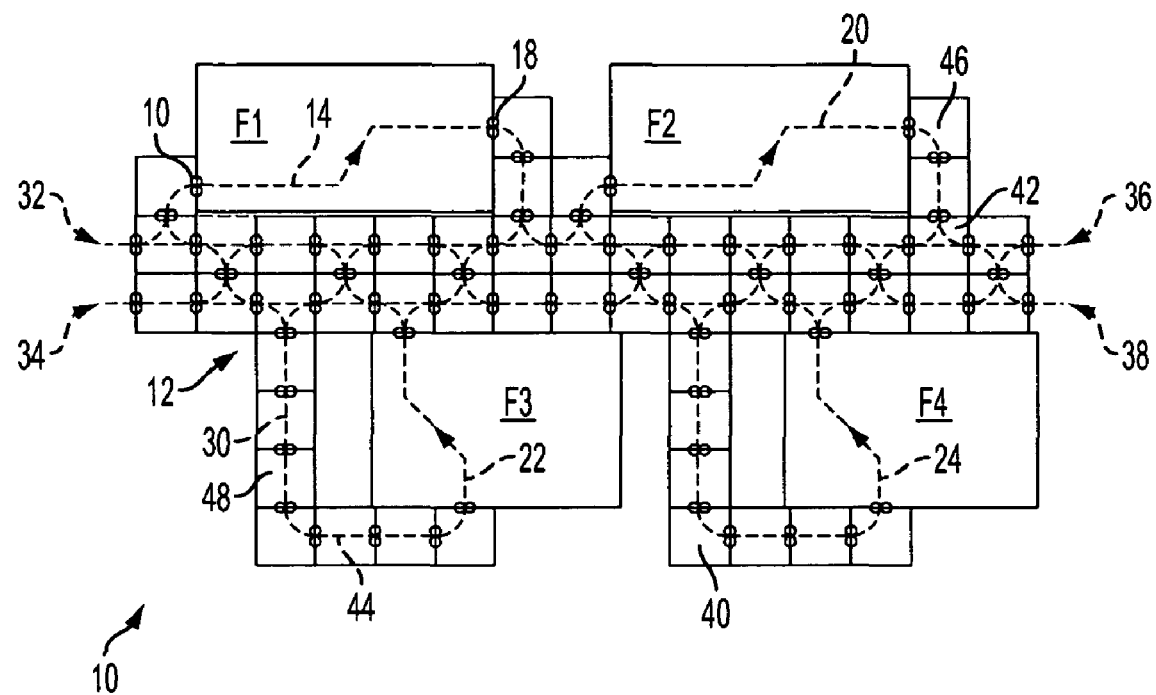
FIG. 1 is a schematic view of a tightly integrated sheet processing system showing an exemplary application of the embodiments of the present application.

FIG. 1 shows an exemplary hypermodular tightly integrated parallel processing system 10 for illustrating an application of the subject preferred embodiments. The system 10 illustrated includes a plurality of sheet functional entities F1-F4 interconnected by a plurality of hypermodular sheet transport modules indicated generally as a set of modules 12. It is to be appreciated that the sheet functional entities F1-F4 may include any functional processing apparatus but, in the preferred embodiments, include sheet functional entities such as printers, feeders, finishers, and the like. Further, those skilled in the art will appreciate that the system 10 is composable and re-composable into a large variety of configurations as desired or needed. Preferably, the system is re-composable by moving, adding, removing or replacing one or more of the sheet functional entities F1-F4 and then adding, removing, and rearranging the sheet transport modules to build various sheet feed paths between the remaining functional entities as desired. Also, the system is re-composable by simply removing, adding or replacing one or more of the transport modules within the set 12 without changing the sheet functional entities.

In the exemplary system illustrated, a first paper path 14 is defined by the first sheet functional entity F1. The first paper path 14 enters the first sheet functional entity F1 at a sheet receiving end 16 and exits the first entity at a sheet output end 18 thereof. Similarly, each of the second, third, and fourth sheet functional entities F2-F4 in the exemplary system illustrated define respective second, third, and fourth paper paths 20, 22, and 24 therethrough.

At times it is desirable to connect the functional entities in various arrangements to perform operations in a selected sequence. As an example, it might be necessary to connect the output of the first sheet functional entity F1 with one or more of the second through fourth sheet functional entities F2-F4 to perform sequential operations on sheet workpieces. It might further be desirable to route the sheet workpiece output from one of the functional entities F2-F4 back to the input of functional entity F1, as an example. To that end, it is to be appreciated that the transport module set 12 interconnects the sheet functional entities and provides a modifiable sheet path circuit 30 for enabling the transport and routing of sheet workpieces between the sheet functional entities for reasons that should be apparent to those skilled in the art. The exemplary sheet path circuit 30 shown includes a pair of sheet receiving ports 32, 34 for receiving sheets into the system 10 and, correspondingly, a pair of sheet output ports 36, 38. In that way, one or more sheet workpieces can be inputted into the system 10 through one or the other of the sheet processing ports 32, 34 and routed to one or more of the sheet functional entities F1-F2 for processing thereon and, thereafter, for outputting from the system 10 through one or the other of the sheet output ports 36, 38. The system is of adequate size as illustrated in the example to accommodate more than one sheet workpiece at a time. More particularly, the system is capable of routing and processing several sheet workpieces simultaneously.

Importantly, the transport module set 12 includes a plurality of hypermodular transport modules 40 of different forms and functions which are configured to be composable and re-composable into a wide variety of selectable configurations. To that end, each of the transport modules can be considered as a "building block" of the overall transport module set 12. Examples of transport modules 40 include a T bidirectional module 42, a horizontal linear bidirectional module 44, an L unidirectional module 46, and a vertical linear bidirectional module 48. Of course, those skilled in the art will appreciate that other forms, shapes, sizes, and configurations of transport modules 40 can be added to the transport module set 12 to re-compose the set into a larger system for accommodating additional sheet functional entities or for providing additional flow paths through the existing set of sheet functional entities shown in the exemplary arrangement. As well, other forms of transport modules not now known and modules beyond those shown here and described in detail below can be implemented in accordance with the present application.

In accordance with the present embodiments, automatic methods, apparatus, and systems are provided for enabling self-identification of each individual module and, ultimately, of the system layout. The automatic methods and systems hide the complexity of the system while assisting the manufacturer and end users in the assembly and analysis of the system. In one form, the system includes a high level controller with a sheet planning processor for determining the interconnections between all of the elements in the system, acquiring the capabilities of each element, finding all possible sheet workpiece routes through the system, and resolving the routes into sets of sheet workpiece itineraries in order to properly control the flow of material through the system for processing the workpieces using selected ones of the sheet functional entities F1-F4. A centralized serial system will be described as well as a centralized parallel system as examples of centralized control schemes. In another form, the system control is distributed among the interconnected modules whereby each module shares in the overhead of the shared control and system configuration determination function.

It is to be appreciated that embodiments of the present application extend in scale from centralized control to distributed control and between, and from local communications to global communication and between, and any combination thereof in the continuum of a control-communication plane.

Figure 2:
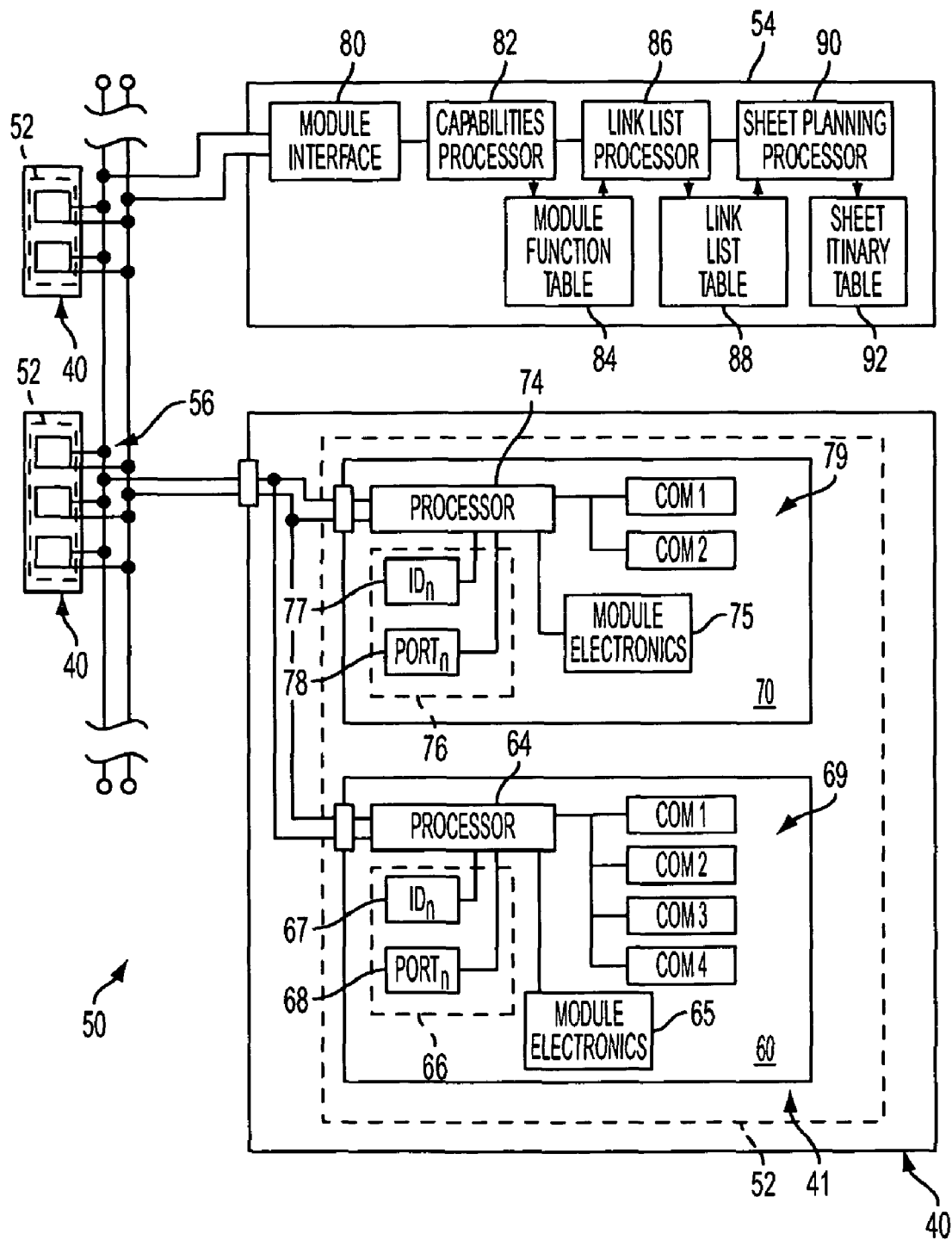
FIG. 2 is a schematic representation of an automated identification system for path connectivity formed in accordance with the preferred embodiment.

In FIG. 2, an automatic identification system 50 for path connectivity is illustrated in schematic form. The system includes generally a plurality of local transport module circuits 52 disposed at each of the transport modules 40 within the transport module set. Preferably, each of the plurality of local transport module circuits are mutually interconnectable electrically via a global system bus 56 or, alternatively, by a local communications bus (not shown) wherein each module communicates directly with neighbor modules in a manner to be described in greater detail below. For purposes of describing the preferred embodiment of the system 50, however, only a single representative local transport module circuit 52 is shown in schematic form in FIG. 2 in an exemplary transport module 41. It is to be appreciated, however, that a plurality of local transport module circuits are disposed in the system 10 at each of the transport modules 40 conveying sheet workpieces between the sheet functional entities F1-F4. Further, in the preferred embodiment illustrated, the global system bus 56 is a two-wire communication bus. However, other bus structures and technologies such as wireless RF, infrared, or any other now known or hereinafter developed technologies, for example, can be used as well.

The automatic identification system 50 in the embodiment illustrated further includes a main central circuit 54 operatively coupled with each of the local transport module circuits 52 through the global system bus 56. The main central circuit 54 is adapted to coordinate operations of each of the transport module circuits 50 as well as develop module interconnection link lists and workpiece itinerary tables as will be described in greater detail below. It is to be appreciated, however, that the discrete main control circuit 54 can be replaced equivalently by a fully distributed main control (not shown) by allocating selected portions of the functionality and hardware of the circuit 54 shown to each of transport modules 40 in the system. The description below is intended to include and cover these and all other equivalent devices and component arrangements. Also, the global system bus 56 can be replaced with a localized communication scheme as desired.

In their preferred form, the local transport module circuits 52 of each of the transport modules 40 include a director submodule circuit 60 and at least one nip submodule circuit 70. For purposes of illustration and discussion only, the exemplary local transport module 41 shown is for use in a fixed path type director submodule assembly without active directing capabilities. However, other more complicated transport modules are contemplated and several of which will be described in greater detail below by way of example. The director submodule circuit 60 is associated with an electromechanical director sub-assembly portion (not shown in FIG. 2) of the local transport module 41 and, similarly, the nip submodule circuit 70 is associated with an electromechanical nip sub-assembly portion (not shown in FIG. 2) of the local transport module 41. In the preferred embodiment, local transport module 40 includes, in a paired or set relationship, at least one director sub-assembly portion and at least one nip sub-assembly portion for feeding sheet workpieces into and/or out from the corresponding director sub-assembly portion. Mechanical aspects of several representative embodiments of the preferred local transport modules 40 will be described in greater detail below.

The director submodule circuit 60 includes a processor 64 in operative communication with module electronics 65 and a memory 66 storing identification data 67 and port data 68. The identification data 67 contains information useful to the main control circuit 54 for identifying the functionality of the director submodule circuit 60. The identification data 67 is also useful, selectively, as an index into a database storing functionality and other data related to the modules. The port data 68 is useful for identifying particular director submodule circuits 60 from among others embedded in other transport modules 40 operatively coupled on the module system bus 56. The identification and port data are provided in the distributed control embodiment and are used as well for equivalent purposes as will be described herein. Lastly, the director submodule circuit 60 includes a plurality of communication port circuits 69 configuring the director submodule circuit for operative communication with respective adjacent communication circuits of other local submodule circuits and/or with respective adjacent nip or director submodule circuits in a manner to be described in greater detail below. The communication port circuits 69 are adapted to communicate with adjacent other communication circuits of other local transport modules for exchanging identification data with neighbor circuits to enable the processor 64 to determine and deliver path connectivity information automatically to the main central circuit 54 in the centralized control topology, and to deliver path connectivity information from the processor 64 to other processors in other submodule circuits. Further, the communication port circuits 69 operate to communicate with adjacent other circuits within the automatic identification system 50 to selectively exchange functionality data to then be communicated to the main central circuit 54 or to other submodule circuits through the global system bus 56.

Similar to the director submodule circuit 60, each nip submodule circuit 70 within the exemplary local transport module circuit 41 of each hypermodular transport module 40 includes a processor 74 in operative communication with nip submodule electronics 75 and a memory 76 storing identification data 77 and port data 78. The identification data 77 contains information useful to the main control circuit 54 and to other submodule circuits for identifying the functionality/capabilities, location, and connectivity of the nip submodule circuit 70. As well, the identification data 77 is useful, selectively, as an index into a database storing functionality information and other data related to the submodules. The port data 78 is useful for identifying particular nip submodule circuits 70 from among others operatively coupled on the module system bus 56. Lastly, the nip submodule circuit 70 includes a plurality of communication port circuits 79 for adapting the nip submodule circuit for operative communication with respective adjacent other nip submodule circuits and for communication with any of the several director submodule circuits in a manner to be described in greater detail below for purposes of communicating functionality and path connectivity automatically to the main central circuit 54.

With continued reference to FIG. 2, the main central circuit 54 of the system 50 includes a capabilities processor 82 in operative communication with the bus 56 through a bus interface circuit 80 for generating a module function table 84 holding data representative of the capabilities of each of the director submodule circuits 60 and nip submodule circuits 70 of each of the local transport module circuits 52 connected with the module system bus 56. It is to be appreciated that FIG. 2 illustrates the schematic details of only a single representative local transport module 41. However, preferably, each of the plurality of transport modules 40 in the system includes a similar local transport module circuit 52. Preferably, all possible workpiece paths through the system are identified and listed in the table as available itineraries.

A link list processor 86 is provided in the main central circuit 54 for retrieving data from the module function table 84, processing the data, and generating a link list table 88 providing a unitary and comprehensive source for determining the interconnections and functionality of each of the local transport module circuits, their respective capabilities and functionalities, and for planning for sheet workpiece path connectivity through the system 50. Preferably all of the workpiece exchange junctions between the modules are listed in the link list table.

In the above regard, a sheet planning processor 90 is implemented for drawing information from the link list table 88 based upon parameters regarding specific workpiece job requirements and for generating a sheet itinerary table 92 for holding one or more itineraries representative of the capabilities of the system for moving workpiece sheets through the system 10 shown in FIG. 1. Preferably, all possible workpiece paths through the system are identified and listed in the table as available itineraries. During use of the system, an itinerary defining an optimal sheet path for processing sheet workpieces through one or more of the sheet functional entities F1-F4 is selected from the table 92 and executed by the system 10.

Figure 3A:
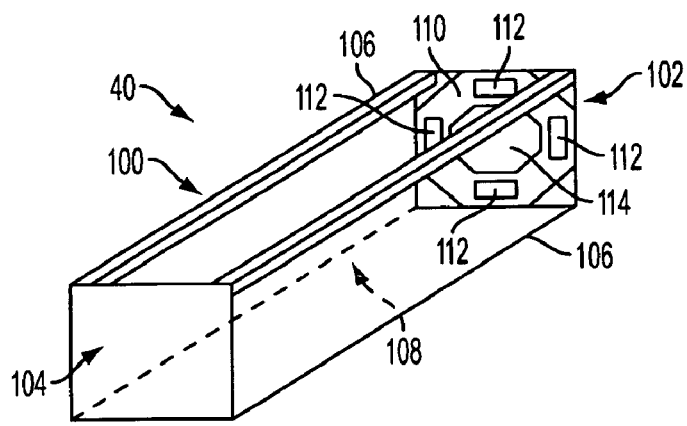
FIGS. 3A-3C are detailed schematic representations illustrating a representative transport module portion of the subject system in accordance with the preferred embodiment.
Figure 3B:
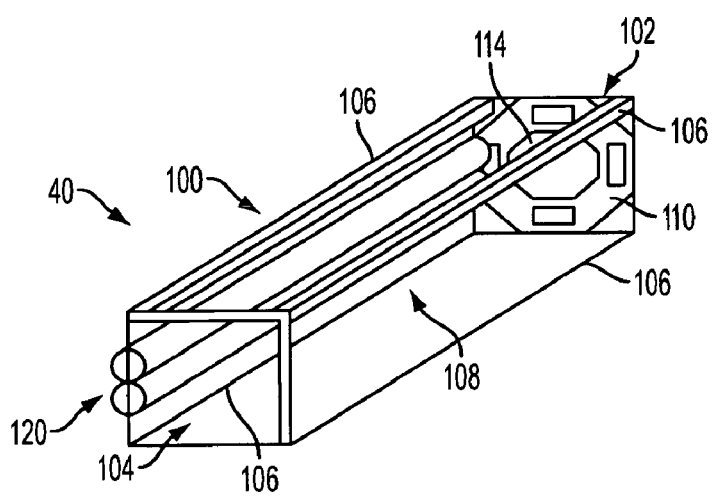
Figure 3C:
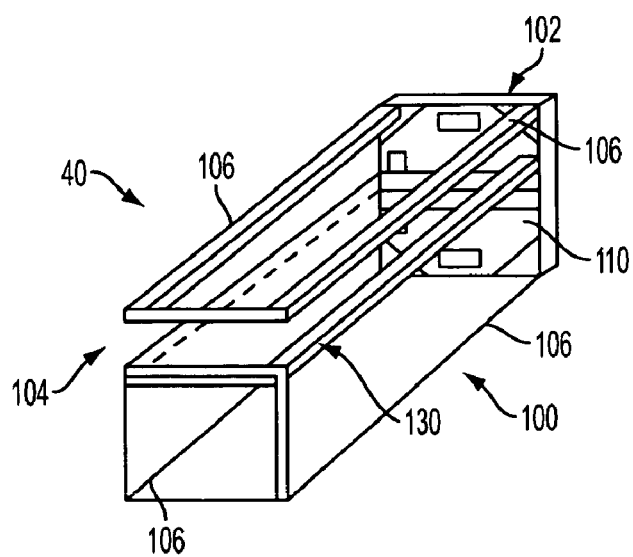

FIGS. 3A-3C show in schematic form a representative transport module 40 in accordance with a preferred embodiment and illustrated in various stages of partial assembly. Each transport module 40 in the system 10 preferably includes a substantially rectangular frame assembly 100 defined by a pair of panel members 102, 104 held in a parallel spaced apart relationship by a set of support rods 106 fastened at each end to the corners of the rectangular panel members 102, 104 substantially as illustrated. A sheet workpiece processing space 108 is defined between the support rods 106 and the panel members 102, 104. The space 108 is adapted to receive at least one nip submodule device 120 as shown in FIG. 3B and at least one director submodule device 130 as illustrated in FIG. 3C.

Although many forms may be used, such as, for example, triangular shapes, pentagons, etc., the preferred frame assembly 100 of the transport module illustrated has a substantially square cylindrical overall shape and is configurable to accommodate up to four nip submodule devices with one nip submodule device positioned at each face of the frame assembly. For this purpose, as best shown in FIG. 3A, the first panel member 102 includes a printed circuit board 110 defining a set of nip receiving zones 112 spaced about peripheral portions of the printed circuit board 110 and a central director receiving zone 114 substantially as illustrated. The nip and director receiving zones 112, 114 include electromechanical connection areas for connecting a plurality of nip submodule devices 120 and at least one director submodule device 130 into the frame assembly 110 thereby forming a completed transport module 40.

It is to be appreciated that director subassembly devices having a wide range of functions can be used in the universal frame assembly 100 illustrated together with one or more nip submodule devices as needed to provide desired sheet path configurations. More particularly, as described above in connection with FIG. 1, the T bi-directional module 42 includes a director submodule device defining a generally T-shaped paper path with active, passive, or a combination of active and passive gates to guide the sheets to and from alternative paths and a set of three nip submodule devices. Preferably, information about the active, passive, or active and passive gates are included in the director information communicated by the module to the controller 54 during system initialization or when the module is first inserted into an active system. The horizontal linear bidirectional module 44, the L-shaped unidirectional modules 46, and the vertical linear bidirectional module 48 each include a director submodule device defining a single straight or curved paper path and a set of two nip submodule devices located at each end of the paper path. For the sake of clarity of description, FIG. 3A shows an empty frame assembly 100 and FIGS. 3B and 3C show a nip submodule device 120 and a director submodule device 130 solely installed in the frame assembly, respectively.

With continued reference to FIGS. 3A-3C, a single nip submodule device 120 is shown in FIG. 3B received in the frame assembly 100 at a position corresponding to an input area of the director submodule device 130 shown received in the frame assembly 100 in FIG. 3C. It is to be appreciated, however, that in practice both the nip submodule device 120 as well as the director submodule device 130 are installed in the frame assembly together as a functional cooperative unit so that the nip rollers can effect movement of sheet workpieces into and from the director submodule device 130. It is to be further appreciated that the nips are preferably mounted at or near the boundaries between modules. Therefore, a given nip can be optionally physically mounted in an adjacent module while still being functionally located at the boundary between modules. In that case, the nip submodule may be rotated 180° about its longitudinal axis converting a feed IN nip into a feed OUT nip, for example, and then mounted in place whereupon the information regarding the nip orientation relative to the frame 100 is communicated to the control together with other relevant data.

Figure 4:
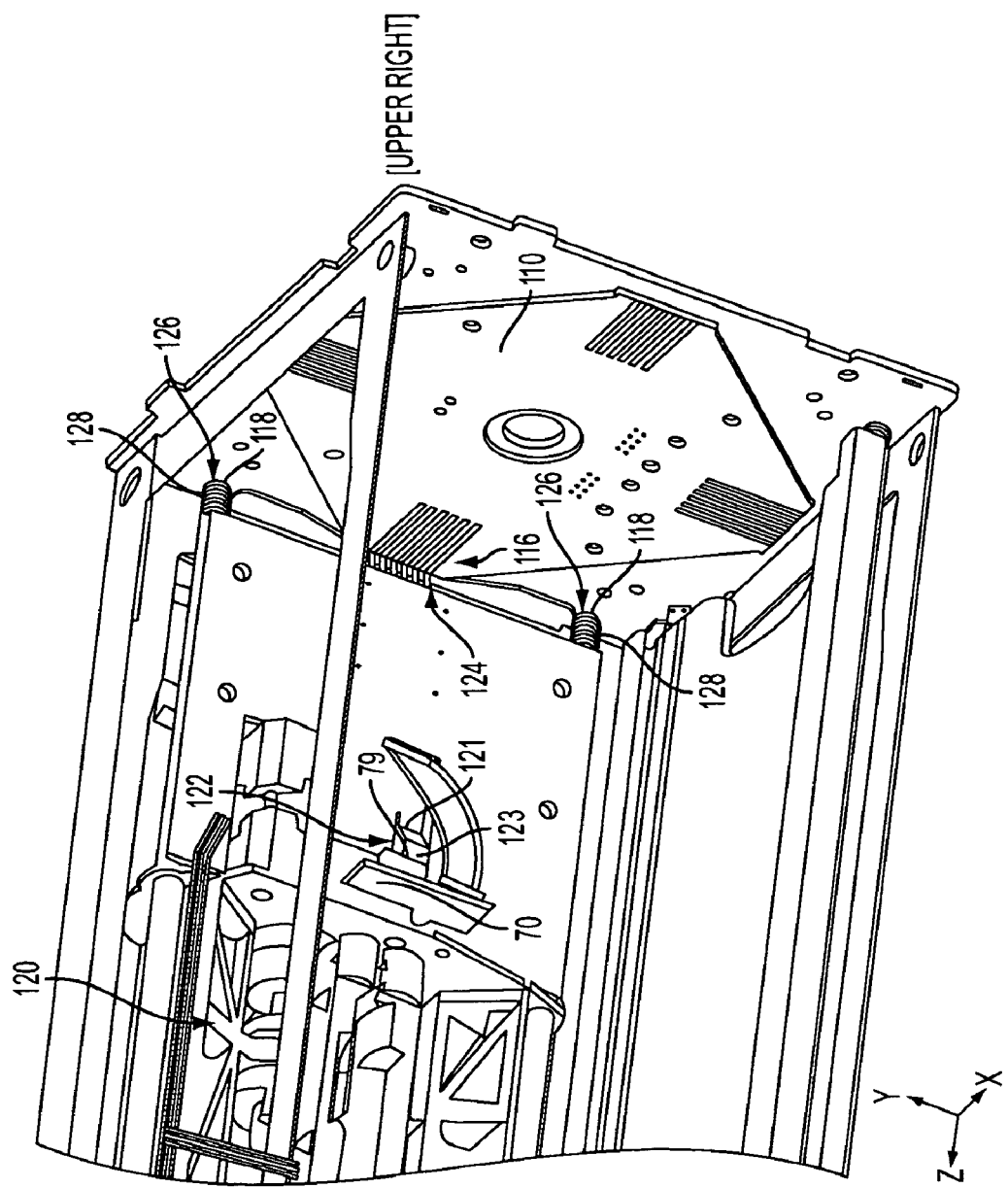
FIG. 4 is a schematic view of a nip submodule received in a frame assembly.

As shown best in FIG. 4, the nip submodule device 120 illustrated includes a nip submodule circuit 70 carried thereon together with a set of communication devices 79 as illustrated. In their preferred form, the communication devices 79 are optical transceivers 122 including a photo optic transmitter 121 and a photo optic receiver 123 for photo optic communication with adjacent devices carrying similar communication equipment, such as, for example, the director submodule device 130 shown in FIG. 5. Although optical transceivers are used in the preferred embodiment, those skilled in the art would appreciate that other forms of nearest neighbor communication modalities may be used equivalently including but not limited to sonic transceivers, mechanical switches and actuators, magnetic signals, signaling or methods, and separate use of emitters and sensors on alternating adjacent module neighbors. As shown, the nip submodule device 120 includes an electrical connection area 124 for engaging a corresponding electrical connection area 116 provided on the printed circuit board 110 and, further, includes a mechanical connection area 126 preferably in the form of a set of spring loaded pogo members 128 adapted for receipt by a corresponding set of electrical contact pads or receptacles 118 defined or disposed on the printed circuit board 110. In one form, optionally, the optical links include a set of optical transmitters only on the nips and a set of optical receivers only on the directors.

Figure 5:
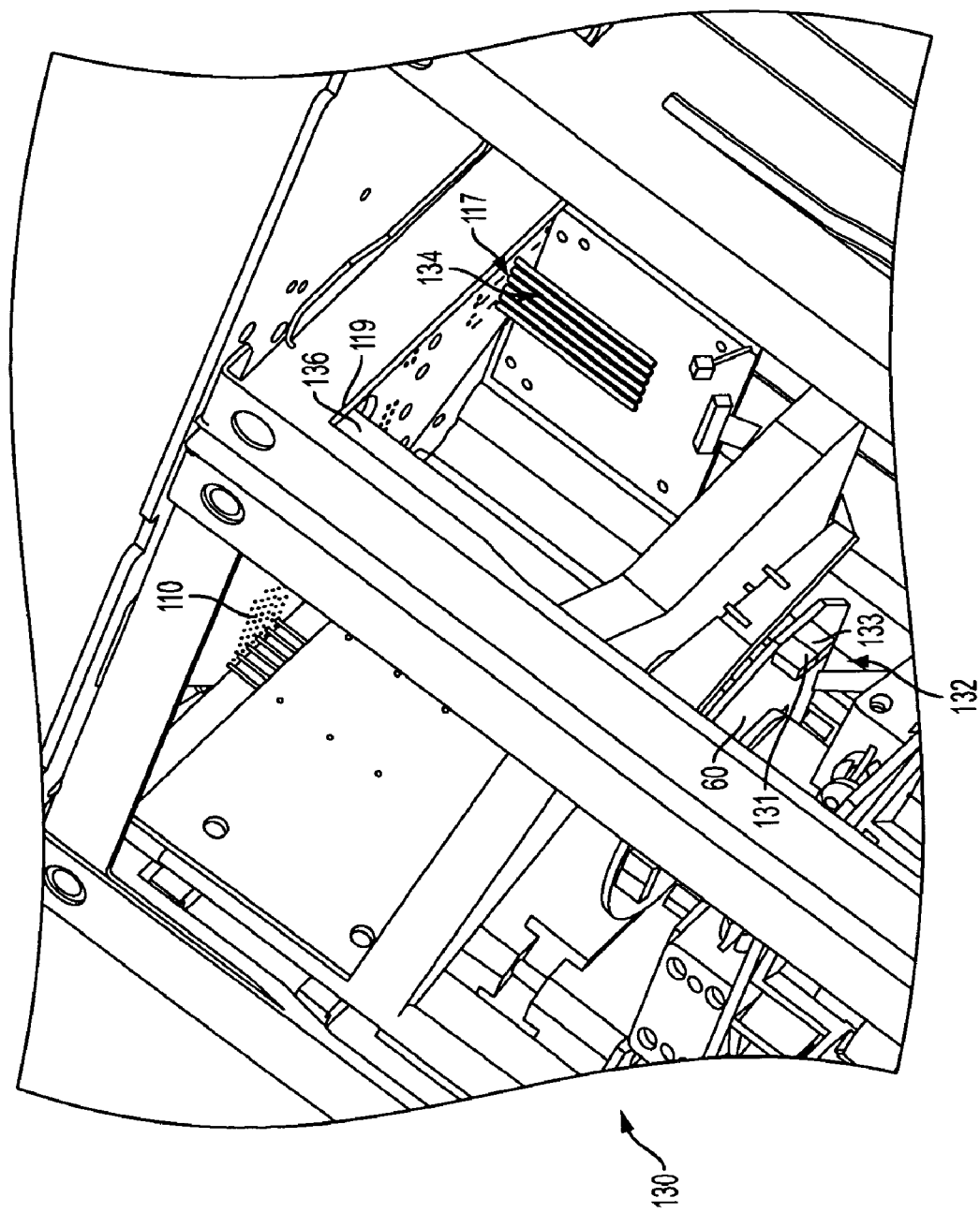
FIG. 5 is a schematic view showing a director submodule received in the frame assembly of FIG. 4.

Similarly, as shown in FIG. 5, the director submodule device 130 includes a director submodule circuit 60 substantially as described in FIG. 2 above together with a plurality of local communication devices 69 including a set of optical transceivers 132 adapted to communicate with the optical transceivers 122 of the nip submodule device 120. The director submodule device 130 includes electrical and mechanical connection areas 134 and 136 adapted to engage a corresponding set of electrical and mechanical connection areas 117 and 119 provided on the printed circuit board 110 substantially as shown.

Figure 6A:
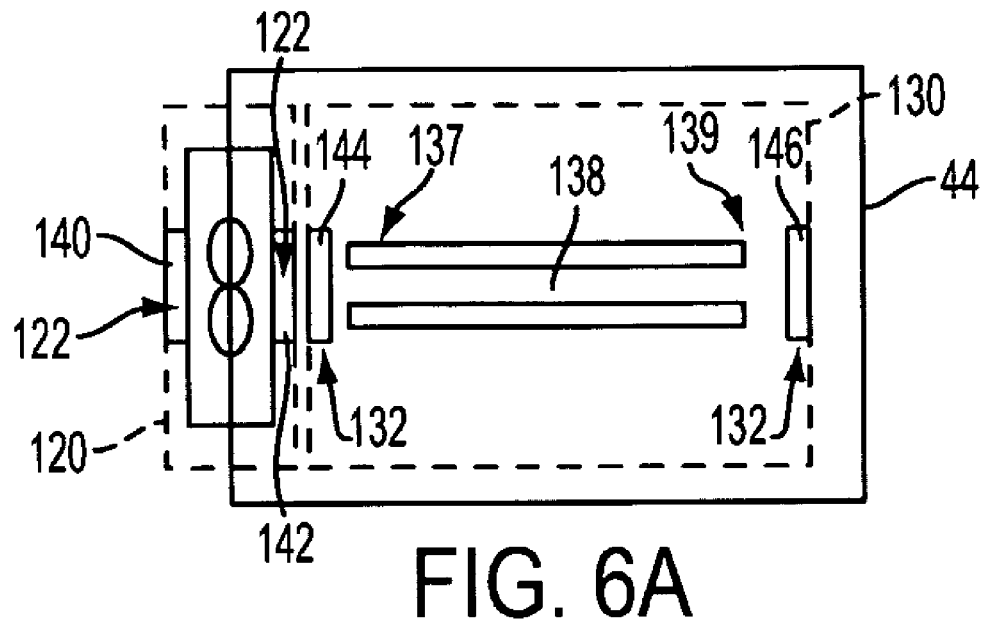
FIGS. 6A-6D are schematic illustrations of representative sheet transport modules used in the system of FIG. 1.

FIGS. 6A-6D and 7 will be used for schematically describing, by way of example, the function and capabilities of the automatic identification system 50 indicated above. To that end, by way of example only, FIG. 6A shows a schematic representation of a horizontal linear bidirectional module 44 shown generally in less detail than in FIG. 1 and discussed above. As illustrated, the module 44 includes a director submodule device 130 defining a straight linear sheet path 138 and a nip submodule device 120 located at the edge of the module 44 and at a selected position relative to paper path 138 defined by the director submodule device 130. More particularly, the nip 120 is positioned at a first end 137 of the generally horizontal bidirectional paper path 138. For reasons which will become apparent below, selectively, a nip is not provided at the second end 139 of the paper path 138 although a nip can be located at the second end 139 as well if desired. Although any naming conventions may be used, the paper path 138 is generally an east-west path as viewed in the FIGURE. The nip 120 includes sets of optical transceivers 122 on opposite input and output sides thereof. The first optical transceiver 140 is adapted to communicate with a similar optical transceiver of an associated other transport module (not shown) disposed to the immediate left of the horizontal linear module 44 illustrated in the figure. The second optical transceiver 142 of the nip 120 is adapted to communicate with a first optical transceiver 144 of the pair of transceivers 132 provided at the first end 137 of the paper path 138 of the director submodule device 130. Similarly, the second optical transceiver 146 of the director module 130 is adapted to communicate with an associated other optical transceiver (not shown) associated with a transport module disposed immediately to the right of the horizontal bi-directional module 40 illustrated in the figure.

Figure 6B:
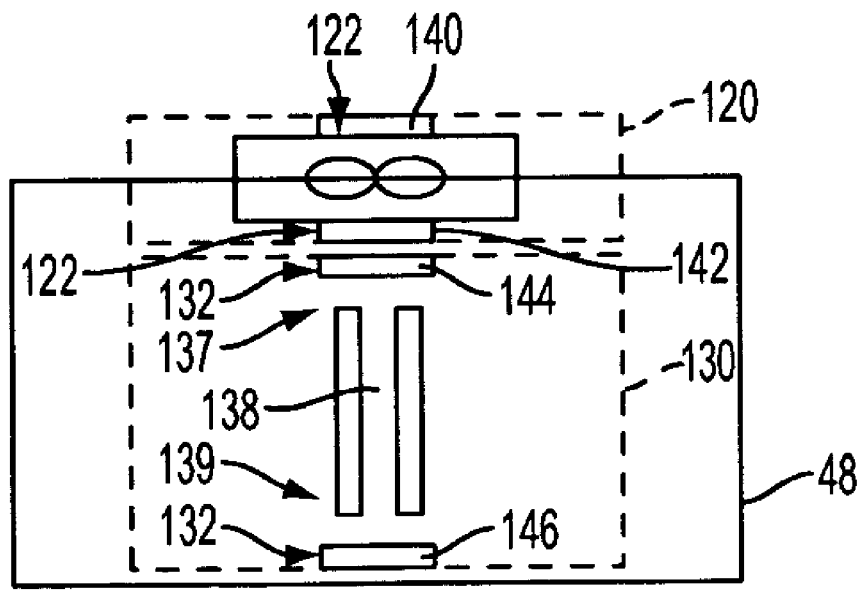

FIG. 6B shows a schematic representation of a vertical linear bi-directional module 48 shown generally in less detail in FIG. 1 and discussed above. As illustrated, the module 48 includes a director submodule device 130 defining a straight linear sheet path 138 and a nip submodule device 120 located at the edge of the module 48 and at a selected-position relative to the paper path 138 defined by the director submodule device 130. It is to be appreciated that the vertical linear bi-directional module 48 is substantially identical to the horizontal bi-directional module 44 shown in FIG. 6A and described above but having a modified orientation. More particularly, in the vertical module 48, the linear paper path 138 is directed in a north-south path rather than the east-west path as described above in connection with FIG. 6A. Again, any naming convention can be used for identifying the orientation. In any case, the director submodule device 130 is essentially rotated 90 degrees to effect the vertical paper path as shown. Correspondingly, the nip submodule device 120 is positioned relative to the frame assembly 100 described above at a location corresponding to one of the first or second ends 137, 139 of the straight linear paper path 138. As illustrated in the figure, the nip submodule device 120 is located at the first or top end 137 of the paper path. However, the nip submodule device can be located at the second or bottom end 139 as well.

With continued reference to FIG. 6B, similar to the system of FIG. 6A, the nip 120 includes a set of optical transceivers 122 on opposite input and output sides thereof. The first optical transceiver 140 is adapted to communicate with an associated other transport module (not shown) disposed immediately above the vertical linear module 48 illustrated in the figure. The second optical transceiver 142 of the nip 120 is adapted to communicate with a first optical transceiver 144 of the pair of transceivers 132 provided at the first end 137 of the paper path 138 of the director submodule device 130. Similarly, the second optical transceiver 146 of the director module 130 is adapted to communicate with an associated other optical transceiver (not shown) associated with a transport module disposed immediately below the vertical bidirectional module 48 illustrated in the figure.

Figure 6C:
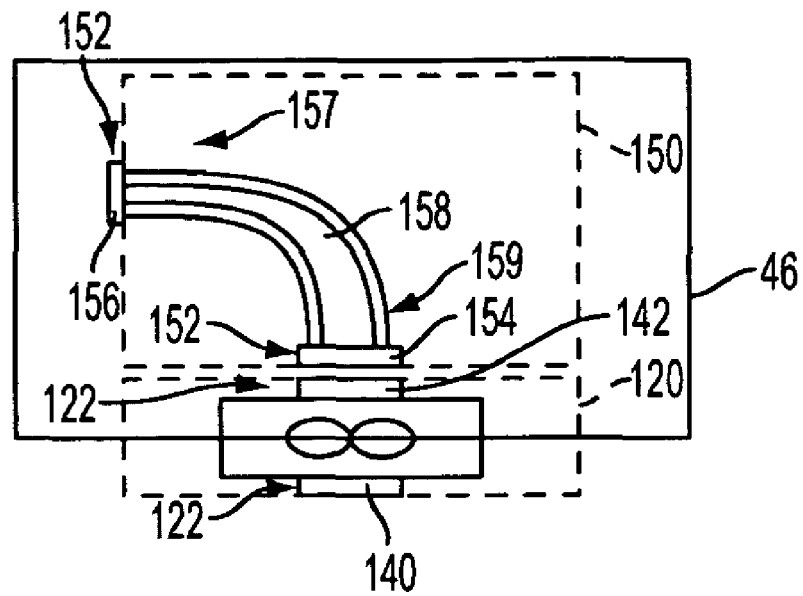

FIG. 6C shows a schematic representation of an L unidirectional module 46 shown generally in less detail in FIG. 1 and discussed above. As illustrated, the module 46 includes a director submodule device 150 defining an arcuate sheet path 158 and a nip submodule device 120 located at the edge of the module 46 and at a selected position relative to the paper path 158 defined by the director submodule device 150. More particularly, the nip 120 is positioned at a second end 159 of the arcuate paper path 158. It is to be appreciated, however, that the nip 120 can be provided as well at the first end 157 of the arcuate paper path 158 as desired. Correspondingly, a pair of nips 120 can be disposed at each of the first and second ends 157, 159 of the paper path 158 as necessary or desired. The paper path 158 is generally a west-south path as viewed in the figure. The nip 120 includes a set of optical transceivers 122 on opposite input and output sides thereof. The first optical transceiver 140 is adapted to communicate with an associated other transport module (not shown) disposed immediately below the L-unidirectional module 46 illustrated in the figure. The second optical transceiver 142 of the nip 120 is adapted to communicate with a first optical transceiver 154 of the pair of transceivers 152 provided at the second end 159 of the curved paper path 158 of the director submodule device 150. Similarly, a second optical transceiver 156 of the director module 150 is adapted to communicate with an associated other optical transceiver (not shown) associated with a transport module disposed immediately to the left of the L-unidirectional module 146 illustrated in the figure.

Figure 6D:
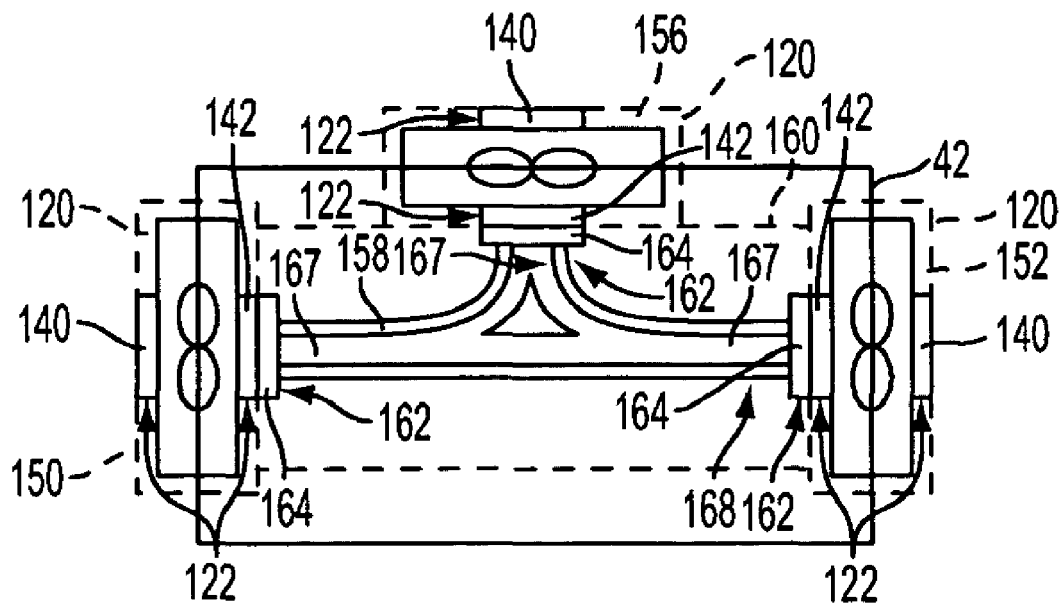

A T bi-directional module 42 is illustrated in schematic form in FIG. 6D. The module 42 includes a director submodule device 160 defining a T-shaped sheet path 168 and a set of nip submodule devices 120 located at the edges of the module 42 and at selected positions relative to the paper path 168 defined by the director submodule device 160. More particularly, the nips 120 are positioned at each of the open ends 167 of the generally T-shaped paper path 168. It is to be appreciated, however, that a set of nips less than the set illustrated in the figure, such as one or two nip submodule devices, can be provided at selected ends 167 of the T sheet path 168 as desired. In any case, the paper path 168 is generally an east-north-west path as viewed in the figure. Each of the nips 120 includes a set of optical transceivers 122 on opposite input and output sides thereof. The first optical transceivers 140 of each nip submodule 120 are adapted to communicate with an associated other transport module (not shown) disposed to the immediate left, top, or right of the module 42 illustrated in the figure. The second optical transceiver 142 of each nip 120 is adapted to communicate with a first optical transceiver 164 of the pair of transceivers 162 provided at the ends 167 of the paper path 168.

Figure 7:
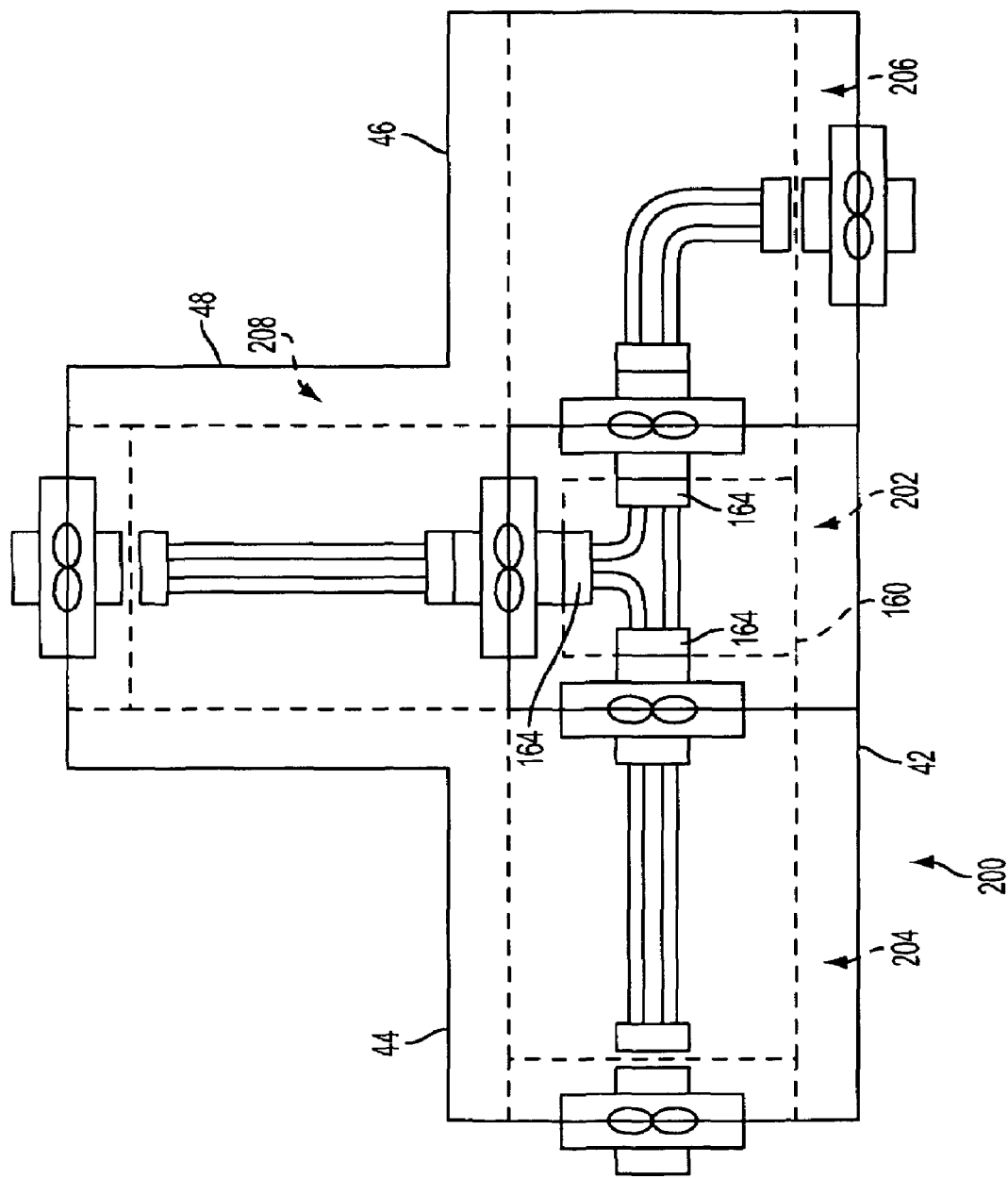
FIG. 7 is a simplistic assembly schematic showing the sheet transport modules of FIGS. 6A-6D arranged for purposes of facilitating a description of the preferred embodiments by way of example.

The modules 42-48 described above may be arranged into a transport module set 200 as desired. To that end, FIG. 7 shows a T di-directional module 42 disposed in a transport module set 200 by way of example at the bottom center position 202 to the right of a horizontal linear bidirectional module 44 at a bottom left position 204, to the left of an L unidirectional module 46 at the bottom right position 206, and under a vertical linear bidirectional module 48 at a top center position 208. It is to be appreciated that each of the transport modules described above and illustrated schematically are configurable and re-configurable into conformations other than those illustrated. As an example, the T di-directional module 42 can be provided without any nip submodule devices 120. In that case, an additional nip submodule device 120 would be added to each of the horizontal module 44, the L unidirectional module 46, and the vertical linear bi-directional module 48. In that configuration, the nip submodule devices 120 added to each of the modules 44-48 would communicate directly with the transceivers 164 of the director T submodule device 160. Essentially, the nip submodule devices 120 form a "glue" between the functional modules 42-48 and similarly the director submodule devices form a glue between the nip submodule devices. From an overall perspective, the communication chain or links formed between functional modules 42-48 and nip submodule devices 120 acts as a proxy for the physical sheet paper path.

Figure 7A:
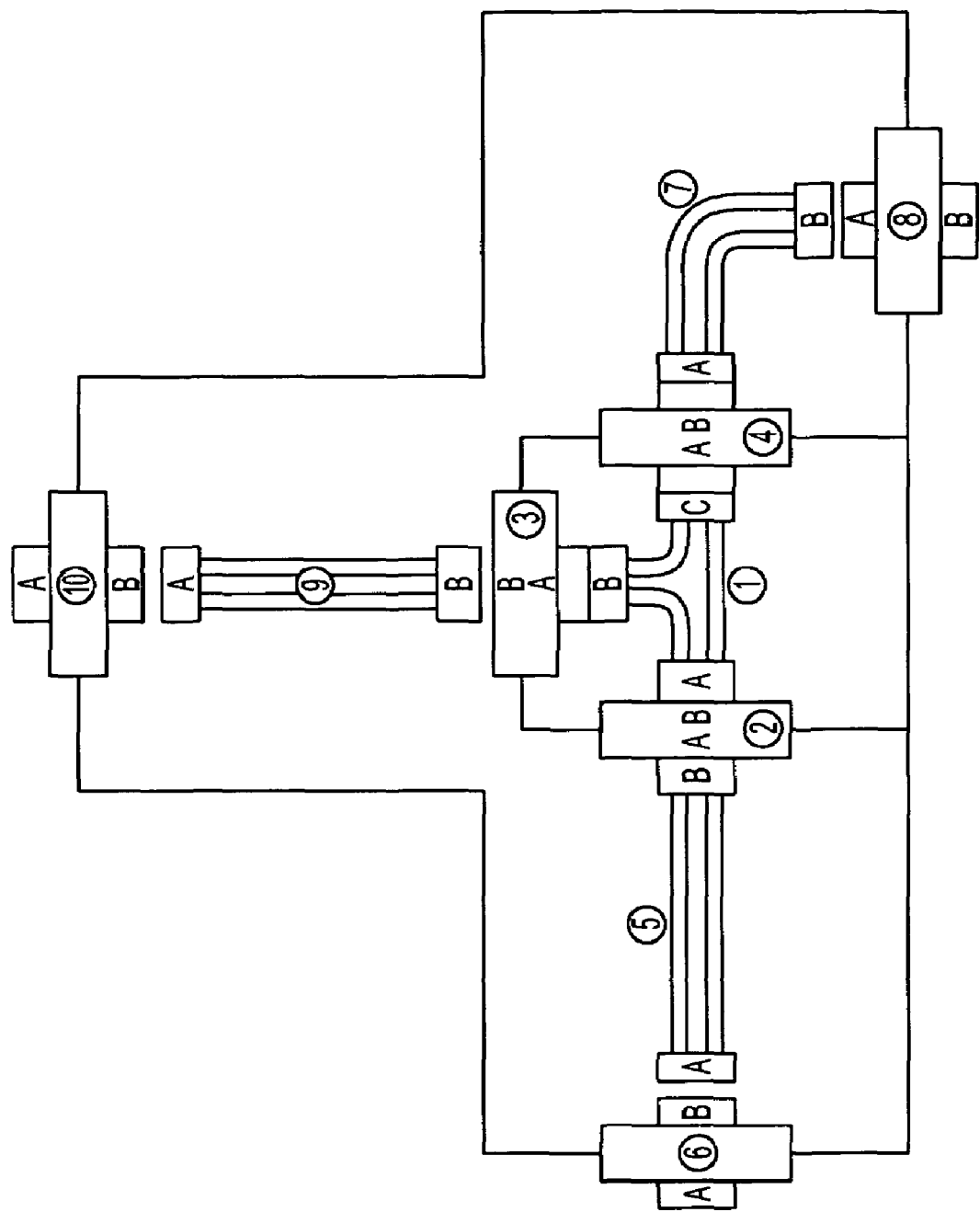
FIG. 7A is a schematic representation showing identification and port assignments for modules of the system shown in FIG. 7.

FIG. 8 shows, by way of example, a module function table 84 used by the capabilities processor 82 discussed above and based on the transport module set 200 illustrated in FIG. 7. It is to be appreciated that the transport module set described above is used for purposes herein of illustration only and not for limiting the present application. A wide variety of module set configurations are possible including those shown in FIG. 1 and others as well. It is advantageous that the present system is easily configured and reconfigurable with automated identification for path connectivity in a manner to be described below. FIG. 7A is a functional schematic showing of the system 200 of FIG. 7.

The module function table 84 includes a first column 210 holding data received from each of the director and nip submodule circuits 120, 130, 150, and 160 included in the transport module set 200 shown in FIG. 7. It will be recalled that in the preferred embodiment, each of the director and nip submodule circuits includes a memory 66, 76 storing director and nip submodule identification data 67, 77. In addition, a second column 212 holds information regarding the type of module e.g. T bidirectional module, nip, etc., and a third column 214 holds port identification data 68, 78 retrieved from each of the director and nip submodule circuits 60, 70 included in the transport module set 200 shown by way of example in FIG. 7. Lastly, a functional sheet routing capability column 216 and another capability column 218 are included for identifying and listing the functional capabilities of each of the transport and nip modules in the transport module set.

The T bidirectional module 42 shown in FIG. 6D and placed at the bottom center position 202 in the transport module set 200 of FIG. 7 has, for purposes of describing the preferred embodiments, a module identification data value of "001" and a port identification values "A, B, and C" stored in the first and third columns 210, 214 of the module function table 84. The module is of type T bidirectional director and has a functional capability of port A and port C (east/west) bidirectional, port A and port B (west/north) bidirectional, and port B and port C (east/north) bidirectional paper path connections. The bidirectional paper path functionality will be shown using "<->" and the unidirectional paper path functionality will be shown using a "<-" or a "->" symbol.

With continued reference to FIG. 8, the module function table 84 includes data relating to the nip submodules 120 associated with the T submodule device 160. More particularly, the left, top, and right nips relative to the T submodule device 160 have module identification data of "002", "003", and "004" as well as port identification values of "A", and "B" stored in the first and third columns 210, 214 of the module function table 84. The left nip (ID=002) has a functional capability of A<->B (east/west) bidirectional, while the top (ID=003) and right (ID=004) nips have a functional capability of A<->B (north/south) and A<->B (east/west), respectively. Each of these nips provide bidirectional paper path connections.

With still further continued reference to FIG. 8, the module function table 84 includes information relating to the horizontal linear bidirectional module 44, at identification "005", the L unidirectional module 46 at identification "007" and the vertical bidirectional linear module 48 at identification "009." Other information could be included as well and as desired such as, for example, gate switching times, lengths of paths, etc. It is to be noted that nip ID=008 provides only a unidirectional paper path connection.

In addition to the functional modules set out above, the module function table 84 also includes information and data relating to each of the nip submodule devices 120 associated with the functional modules. To that end, the horizontal bidirectional module 44 (shown as horizontal) includes an associated nip module 120 having data in the table including an identification data value of "006" and port identification data of A,B together with a functional capability of connecting A<->B bidirectional (east/west). Similarly, the L unidirectional module 46 includes a nip submodule having an identification data of "008" and a port identification data of A, B together with a functional capability of connecting A->B unidirectional (north/south). Lastly, the linear vertical bi-directional module 48 includes an associated nip submodule device having identification data of "010" and port identification data of A,B together with a A<->B bidirectional (north/south) functional capability. In the example system 200 described, all but one nip (nip ID=008) provide bidirectional paper path connections and all but one of the modules (L uni-dir ID=007) provides bidirectional paper path routing. Again, preferably, the functional capability information is provided into the table 84 by the capabilities processor 82 of the main control circuit 54. Other data may be included as well and as desired such as, for example, maximum speed and/or acceleration and bidirectional or unidirectional flow controls or capability.

As noted above, the link list processor 86 of the main central circuit 54 is adapted to generate a link list table 88 shown in FIG. 9 with data provided by way of example using the transport module set 200 of FIG. 7. Essentially, the link list table 88 sets out the interconnections between the modules arranged as a functional configuration. By way of example, the module set 200 shown in FIG. 7 includes the modules listed in FIGS. 3A-3D defining one or more particular paper paths therethrough as enabled by the links in the link list table.

As can be seen in FIG. 9, the link list table sets out the interconnections between all of the modules within the system 200 arranged in pairs. To that end, the T bidirectional module 42 is represented in the above as ID=001 and, as described above, is connected to ID modules ID=002, ID=003, and ID=004. To that end and with reference to FIGS. 9 and 7A, the link list table includes an entity reflecting that, for the T bidirectional module ID=001, port A is connected to port B of ID=002 while ports B and C of the T bidirectional module are connected to port A of modules ID=003 and ID=004, respectively. Similarly, the each of the nips surrounding the T bidirectional module (ID=002, ID=003, and ID=004) generate entries in the link list table 88 representing the paper path connections to modules 1, 5, 9, and 7. Similarly, all of the intermodular connections are represented in the link list table 88 of FIG. 9.

Figure 10:
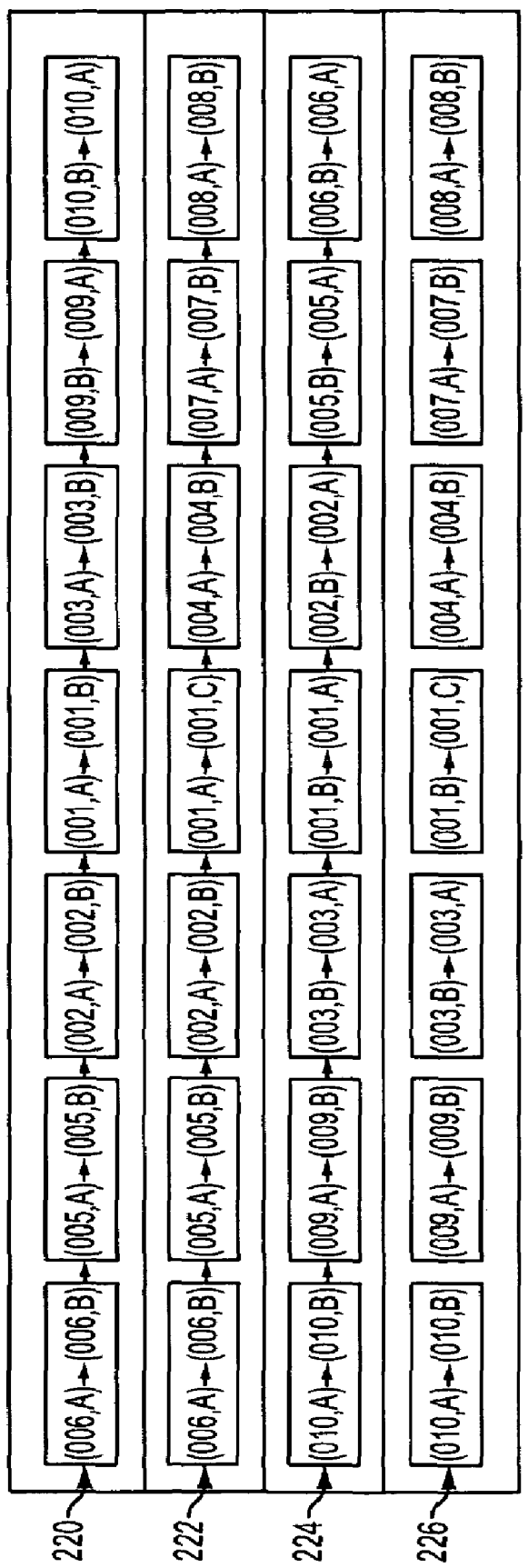
FIG. 10 is a sheet itinerary table used by the system of FIGS. 1 and 2 and illustrating sheet itinerary plans by way of example as determined by the exemplary module arrangement illustrated in FIG. 7.

In accordance with the preferred embodiment, the sheet planning processor 90 of the main central circuit 54 shown in FIG. 2 is configured for retrieving data from the link list table 88 shown in FIG. 9 and compiling an itinerary table 92 shown by way of example in FIG. 10. Essentially, the sheet planning processor 90 executes program instructions to "assemble" a plurality of sheet itineraries based on the capability of the overall transport module set 200 resulting from the individual capabilities of each of the separate and discrete transport modules. From the schematic representation shown in FIG. 7A and the link list table 88 shown in FIG. 9, it is apparent that the nip ID=006 associated with the linear bidirectional module ID=005 adapts the east or leftmost edge of the transport module set 200 as viewed in FIG. 7 for receiving and transmitting sheet workpieces. Similarly, the north or top edge of the nip ID=010 and linear bidirectional module ID=009 are adapted for both receiving and transmitting sheet workpieces relative to the exemplary transport module set 200. Further, the L unidirectional module ID=007 and the associated nip ID=008 adapt the south or bottom edge of the transport module set 200 as an exit only capability.

The sheet planning processor 90 further inspects the link list table 88 to determine all possible permutations of sheet path routes based upon the end points discussed above. To that end, in a general or gross sense, the T bidirectional module ID=001 includes interconnections between its north/top, east/right, and west/left edges. This is shown at the first row of the link list table 88. The linear bidirectional horizontal module ID=005 has, as shown in the link list table, no sheet paths connecting the north/top or south/bottom edges thereof. However, a sheet path is provided between the east and west edges. This is shown in the last two columns and in the second row of the link list table 76.

Using a similar processing technique, other sheet path capabilities such as between the south/bottom and west/left edges of the L unidirectional module ID=007 and a path between the north/top and south/bottom edges of the linear bidirectional module ID=009 are processed.

FIG. 10 shows a sheet itinerary table in a schematic form by way of example illustrating a set of sheet itineraries 220-226 representative of some selected paths through the system shown in FIGS. 7 and 7A. The first sheet itinerary plan 220 illustrates a sheet itinerary used in transporting a single sheet workpiece into the transport module set 200 shown in FIG. 7 from the lower left and exiting at the upper top portion. More particularly, in the first sheet itinerary 220, a single sheet workpiece passes into the system 200 first through the horizontal linear bidirectional module 44, then to the T bidirectional module 42, and, thereafter, out from the system through the vertical linear bidirectional module 48. Initially, the sheet enters the nip ID=006 and passes from port A to port B thereof. Thereafter, the sheet is handled through ID=005 in the horizontal linear bidirectional module 44 from port A to port B thereof. Next, the sheet passes through the nip ID=002 from port A to port B thereof in the T bidirectional module 42. The director ID=001 thereof transports the sheet from port A to port B thereof. Thereafter, the nip ID=003 within the T bidirectional module 42 passes the sheet from port A to port B for input into the vertical linear bidirectional module 48. The sheet transport system there at ID=009 receives the sheet into port B and outputs the sheet therefrom from port A. Lastly, the output nip ID=010 at the top side of the system 200 as viewed in FIGS. 7 and 7A receives the sheet into port B and outputs it from the system through port A.

It is to be appreciated that the other exemplary sheet itineraries 222-226 illustrate alternative sheet paths through the system 200 of FIGS. 7 and 7A by way of example. More particularly, the second itinerary 222 illustrates the itinerary of a sheet entering into the system through the horizontal linear bidirectional module 44, traveling through the T bidirectional module 42 and exiting the system through the L unidirectional module 46.

The third sheet itinerary 224 sets out a workpiece itinerary for a sheet entering into the system through the vertical linear bidirectional module 48, traveling through the T bidirectional module 42 and, lastly, exiting the system through the horizontal linear bidirectional module 44.

Lastly, the fourth sheet itinerary 226 by way of example sets out a workpiece itinerary for a sheet entering into the system through the vertical linear bidirectional module 48 and exiting the system through the L unidirectional module 46.

Figure 11A:
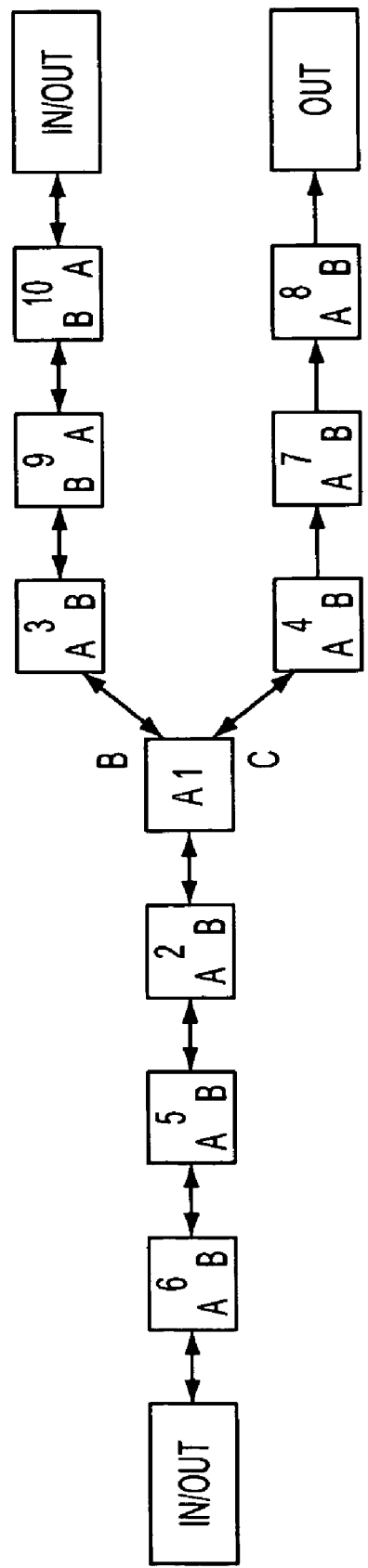
FIGS. 11A and 11B show state processing diagrams representative of the itineraries calculated by the system of FIG. 2 and stored in the table of FIG. 10.
Figure 11B:
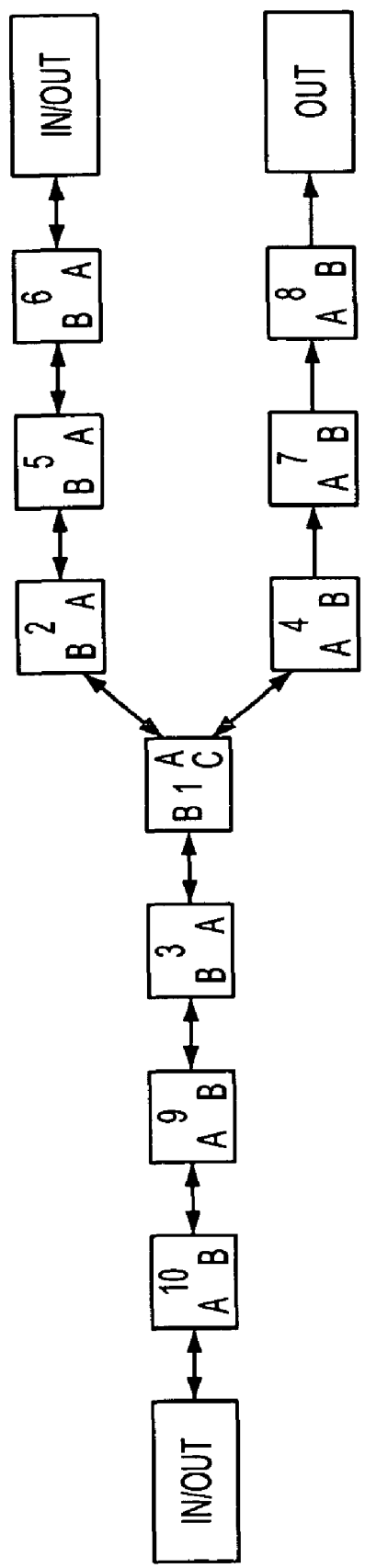

FIGS. 11A and 11B show diagrammatic results, as a connection diagram, of the path processing executed by the sheet planning processor 90 using the exemplary data stored in the link list table 88 of FIG. 9. With reference first to the drawing FIG. 11A, the T bidirectional module ID=001 is illustrated at the center of a connection diagram illustrating a logical connection representative of the physical connections set out in the first row of the link list table 88. To that end, the first module is connected to nip modules ID=002, ID=003, and ID=004. The physical connections represented in the link list table 88 are drawn in FIG. 11A as logical connections.

Next, the horizontal bidirectional module ID=005 is connected with nip modules ID=006 and ID=002 and, in addition, includes an "OPEN" connection adapted for receiving and/or transmitting sheet workpieces therethrough. Of course, the "OPEN" connection could be later connected to another module, feeder, finisher, IME, etc. The physical connections identified in the upper six rows of the link list table 88 are drawn schematically in FIG. 11a in a virtual schematic format.

Next, each of the modules ID=009 and ID=010 have output capabilities and module ID=010 includes an input capability as well. Further, as set out in the last four entries of the link list table 88 of FIG. 9, each of the modules ID=009 and ID=010 are connected to module ID=001 via nip modules ID=003 and ID=004

Thus, FIG. 11A is a connection diagram representing a first portion of a sheet itinerary chart of the transport module set 200 shown in FIG. 7 by way of example. The sheet planning processor 90 in accordance with the preferred embodiment is adapted for forming the itinerary chart in a manner discussed above and, further, generates a sheet itinerary table 92 as shown in FIG. 10. A first sheet itinerary 220 outlines a first capability of connecting the transport module set 200 of FIG. 7. More particularly, the first sheet itinerary 220 includes inputting a sheet workpiece into the horizontal module ID=005 via the nip ID=006, thereafter sending the sheet workpiece to module ID=001 via the nip ID=002, and then sending the sheet through the vertical module ID=009 via the nip ID=003 and out from the system via nip ID=010. This corresponds with a workpiece sheet traveling through the transport module 200 of FIG. 7 beginning from the left module and exiting out from the top.

The sheet itinerary plan 222 stored in the sheet itinerary table 92 of FIG. 10 corresponds to a sheet workpiece traveling through the module set of FIG. 7 beginning from the left and exiting at the bottom right along the bottom row of the three modules in succession.

Yet further sheet itinerary plans are selectively resolved by the sheet planning processor 90 using the link list table 88 with the reversing functionality of the T bi-directional module 42. More particularly, a sheet itinerary plan can be created corresponding to receiving a sheet workpiece into the horizontal module 44 ID=005 via the input nip ID=006 and, thereafter, forwarding the sheet workpiece to the T bi-directional module 42 ID=001. The sheet is essentially "flipped" as it is first extended into the nip ID=003 and then retracted back into the T module ID=001 and forwarded to the exit nip ID=004. Thereafter, the inverted sheet workpiece is passed onto the L unidirectional module ID=007 and out from the system through nip ID=008.

FIG. 11B represents system capabilities for sheet processing when the module ID=009 is used for inputting the sheet workpieces. As shown schematically in FIG. 11B, module ID=009 can be used as a sheet input module through intervening nip module ID=010 and, thereafter, the sheets can be handled by modules ID=001 and either one of module ID=005 to the left or module ID=007 to the right.

A further sheet itinerary plan represents another inversion routine for flipping or inverting the sheet workpiece using the transport module set 200 shown in FIG. 7. More particularly, a sheet workpiece is inputted into the vertical linear bi-directional module ID=009 via the nip ID=010. Thereafter, the sheet is fed into the T bi-directional module ID=001 to be fed to the left nip ID=002 or the right nip ID=004. After the sheet workpiece is at the left nip ID=002, it is sent horizontally to the right as viewed in the figure to the nip ID=004 and, thereafter, back upwardly to the vertical linear bi-directional module ID=009 via the T module ID=001 and intervening nip ID=003. Thereafter, the inverted sheet is ejected from the system through nip ID=010. Alternatively, the downwardly traveling sheet is sent to the right as viewed in the figure to nip ID=004 and, thereafter, to the left nip ID=002 and upwardly through the bi-directional module ID=001 for ejection from the system through the vertical module ID=009.

It is to be appreciated that the example shown in FIG. 7 is a simple form of a tightly integrated parallel processing hypermodular system and is shown for purposes of illustration only. The preferred embodiments include any assemblage of connected components which may or may not be of equivalent size and shape. In the above description, the modules all have the same size for simplicity and ease of discussion only. In addition, although a two dimensional array of modules is shown by way of example, it is to be appreciated that the preferred embodiment is extendable to three dimensioned arrays of modules.

In the preferred form of the present system, each module is associated with an electronic circuit or component such as a processor 64, 74 and with local communication means for communicating with adjacent associated modules. The processors include means of communicating with their nearest neighbors, with their associated module electronics, and, as desired, with a global communication bus 56 for communication of modular information and nearest neighbor information with a supervisory main central circuit 54. In a distributed manner, all links are determined, then reported to the system controller. Alternatively, the system controller is configured to poll each of the submodules including functional submodules as well as nip submodules for extracting capabilities information as well as connection information for developing the tables 84, 88, 92. To that end, when the module set is recomposed, in accordance with a preferred embodiment, each individual model re-identifies itself within the system layout and reports back to the central processor information regarding the subject module and information regarding the nearest neighbors to the subject module. Again, alternatively, the main central circuit 54 is configured to poll each of the functional and nip submodules to extract the information. As new modules are added and existing modules are removed, the new system layout is automatically reported over the existing communication system and the path link list is automatically determined and new itinerary functions are added to or removed from the table 92.

In the above, it is to be appreciated that information relating to modules and to nearest neighbors to the modules is transported to a central processor via a common module bus. This advantageously results in an automatic updating of all of the system tables by the central processor to provide for up to date and accurate sheet path capabilities for efficient worksheet processing through the system.

Figure 12:
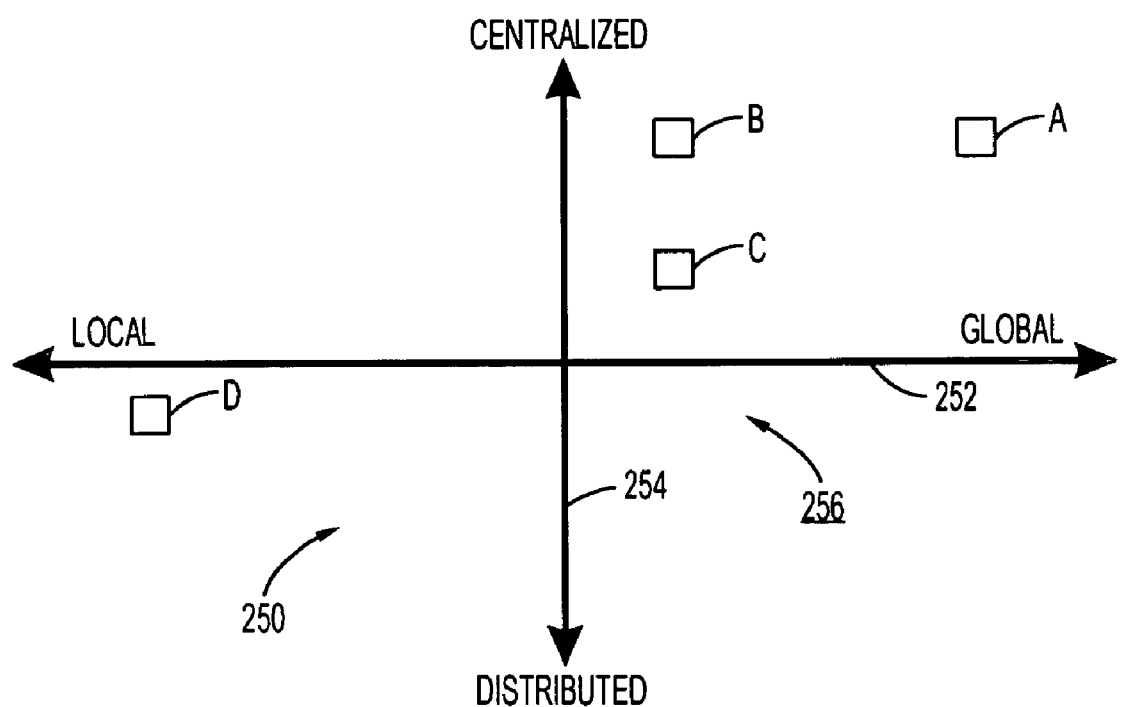
FIG. 12 is a graph illustrating a communication-control configuration plane of the embodiments of the subject system; and, FIGS. 13A-13C are flowcharts illustrating a preferred control flow protocol in accordance with an embodiment of the present application.

FIG. 12 is a representation illustrating in a two-dimensional graphical form the range in which the preferred embodiments of the subject system can be selectively arranged. With reference now to that figure, the space 250 within which the subject system is configurable as illustrated including a communication configuration axis 252 and a control configuration axis 254. The communication configuration axis 252 is arranged on the horizontal or "X" axis while the control configuration axis 254 is set out on the vertical or "Y" axis. Collectively, the communication and control axes define a communication/control configuration plane 256. As noted above, the exemplary system 10 is operable using a global communication bus 56 through which all communication between the central control and the modules is channeled. The global topology of the embodiment illustrated in FIG. 2 is represented in the right half configuration plane 256 divided by the control configuration axis 254, specifically at system A.

Overall, for systems operable to the right in the first and fourth quadrants or right hand side of the configuration plane 256, the communication configuration is more global moving toward the right in the configuration plane. For systems configured without a global system bus 56, communication is executed between modules through the respective communication port circuits 69, 79 as described above. For systems without a global system bus, the communication is considered to be local and, accordingly, those systems lie in the second and third quadrants or left hand side of the configuration plane 256 shown in FIG. 12.

In addition to the above, systems, in accordance with the present invention, can coordinate the process of deriving a link list in a manner that is centralized within a single master processor, distributed amongst the various module processors, or blended in a scheme mixing centralized and distributed algorithms. Systems can use any degree of centralized or distributed processing as necessary or desired. For systems having a main central circuit 54 of the type illustrated in FIG. 12, a position in the configuration plane 256 would include the top half of the plane or in quadrants 1 and 2. That is, systems of the type illustrated in FIG. 2 having a main central circuit 54 are considered to be "centralized" link list processing type topologies. There, the link list is processed by a centralized control. In a fully distributed control system embodiment, the central process 54 is distributed amongst the plurality of modules in a manner described above. In those systems, the link determining processes are distributed and, therefore, the position in the configuration plane 256 is in the bottom half or in quadrants 3 and 4.

It is to be observed in FIG. 12 that system A is a highly centralized system having a global communication configuration. System B is also a highly centralized system having a centralized control configuration but having a somewhat more local communication configuration characteristic than system A. In systems A and B the link list is generated at a central control and the communication is performed more or less globally. Further with reference to FIG. 12, system C has a similar global communication characteristic as system B but it is substantially more distributed in a control sense as shown in the graph. Lastly, system D has a substantially localized communication configuration and a distributed control configuration characteristic. It is to be appreciated that systems formed in accordance with the teachings of the present application are not confined to any particular quadrant in the configuration plane 256 and can be assembled and configured to fall anywhere in the space 250 as illustrated in FIG. 12.

As noted above, communication in the system of the present application is selectable at any point between centralized and distributed extremes. In systems using a centralized communication scheme, the communication can be either serial or parallel. In either case, it is to be appreciated that a global bus 56 is provided connecting all modules to a centralized supervisory host 54 such as shown in FIG. 2 of the present application. In such a scheme, at startup, each module is adapted to transmit either a broadcast message on the global bus 56 or, if the module identification of the supervisory host is known, direct a message at the host. The present discussion includes startup as well as a reset and a system wide startup or whenever a single module is inserted into the system and is activated. Similarly, the link list updating can be run as an intermittent, ongoing process. In any case, the broadcast message transmitted by each module onto the global bus preferably contains information reporting the module's own identification number as well as information that the module is active and is in the system. The supervisory host next commands all modules to listen for and report any incoming messages on their local ports. The supervisory host next commands the new module to transmit on each of its local ports such as shown in the preferred embodiment of FIG. 7A which includes three (3) ports.

The present application includes the case where all of the local transmissions are executed in a serial fashion and, more particularly, executed in a predefined sequence which then simplifies the data quantity to a single bit source of information transmitted by each of the modules in turn. By noting the time between receiving a message from the supervisory host and the incoming local communications, neighboring receiving modules then are able to determine the ports on the new modules which were used to transmit the message. Alternatively, new modules would transmit on all of their available local ports at once, including in each message information indicating which of the local ports the message originated from. In this case, the neighboring receiving module is explicitly told the identity of the local port which it is hearing from as broadcast by the newly added module.

Thereafter, the receiving module understands its own identification, the local port from which it receive the local transmission, and the local port that the new module transmitted on. By sending these three items of information via the global bus 56 to the supervisory host 54 (FIG. 2), the supervisory host is directly able to add this connectivity information to its data store such as the module function table 84. If after a certain period of time, no further reception has been reported to the supervisory host, the host can then assume that the module has no functioning neighbors. This too is information which is added to the data store at the central processor.

In the case of a system-wide power-up or reset of the system, many modules attempt to announce their presence on the bus nearly simultaneously. The supervisory host 54 is adapted to sequence through all of the new module requests, with a protocol requesting from each module to transmit locally, collecting any responses from any neighboring receiving modules, and adding the information gathered to its own data store. In addition to the above, the present system is configured to selectively execute an ongoing or intermittent system wide announcement by the many modules announcing their presence on the local or global communication bus. Here, again, the supervisory host 54 is configured to sequence through all of the module requests, collect any responses from any neighboring receiving modules, and adding the information gathered to its own data store.

Figure 13A:
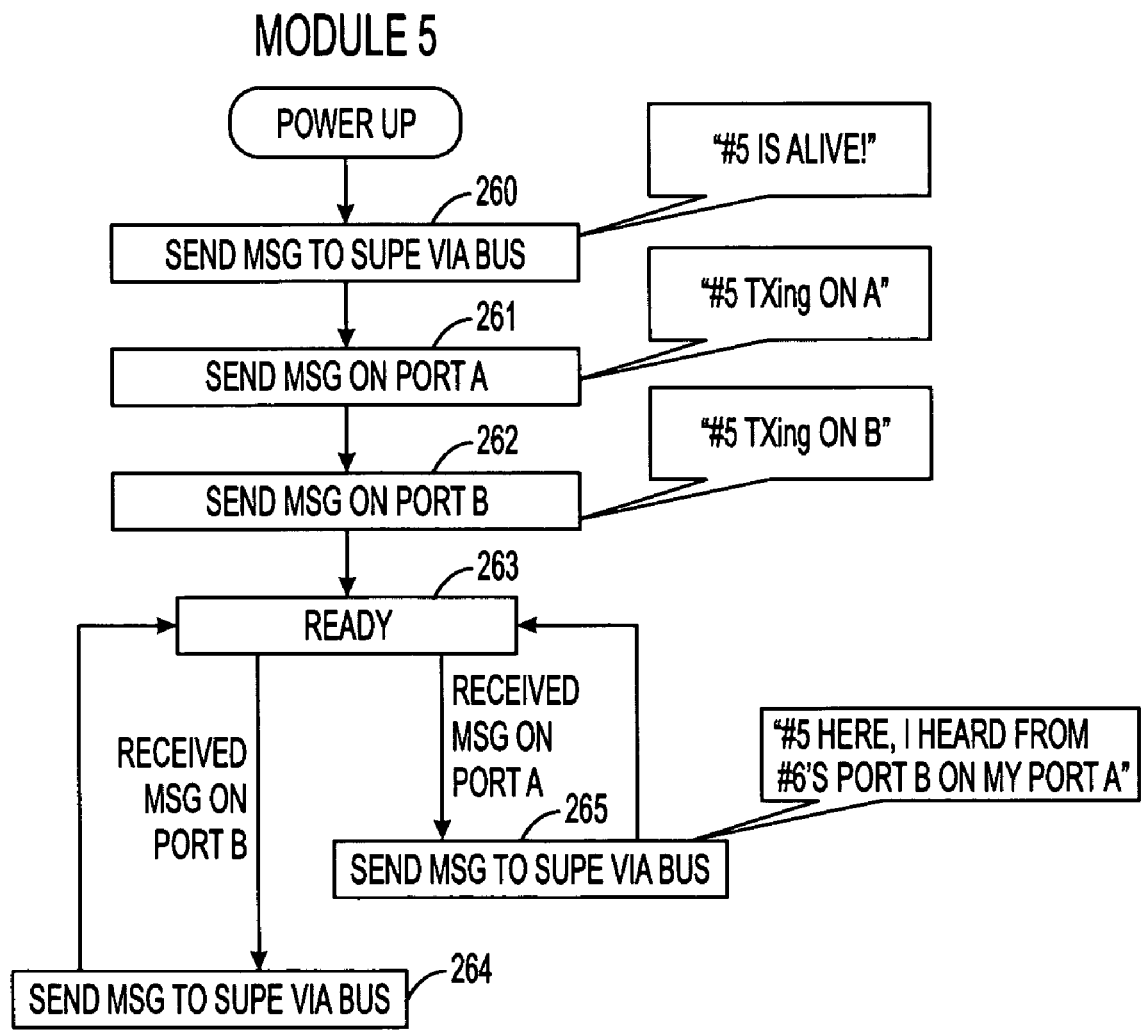
Figure 13B:
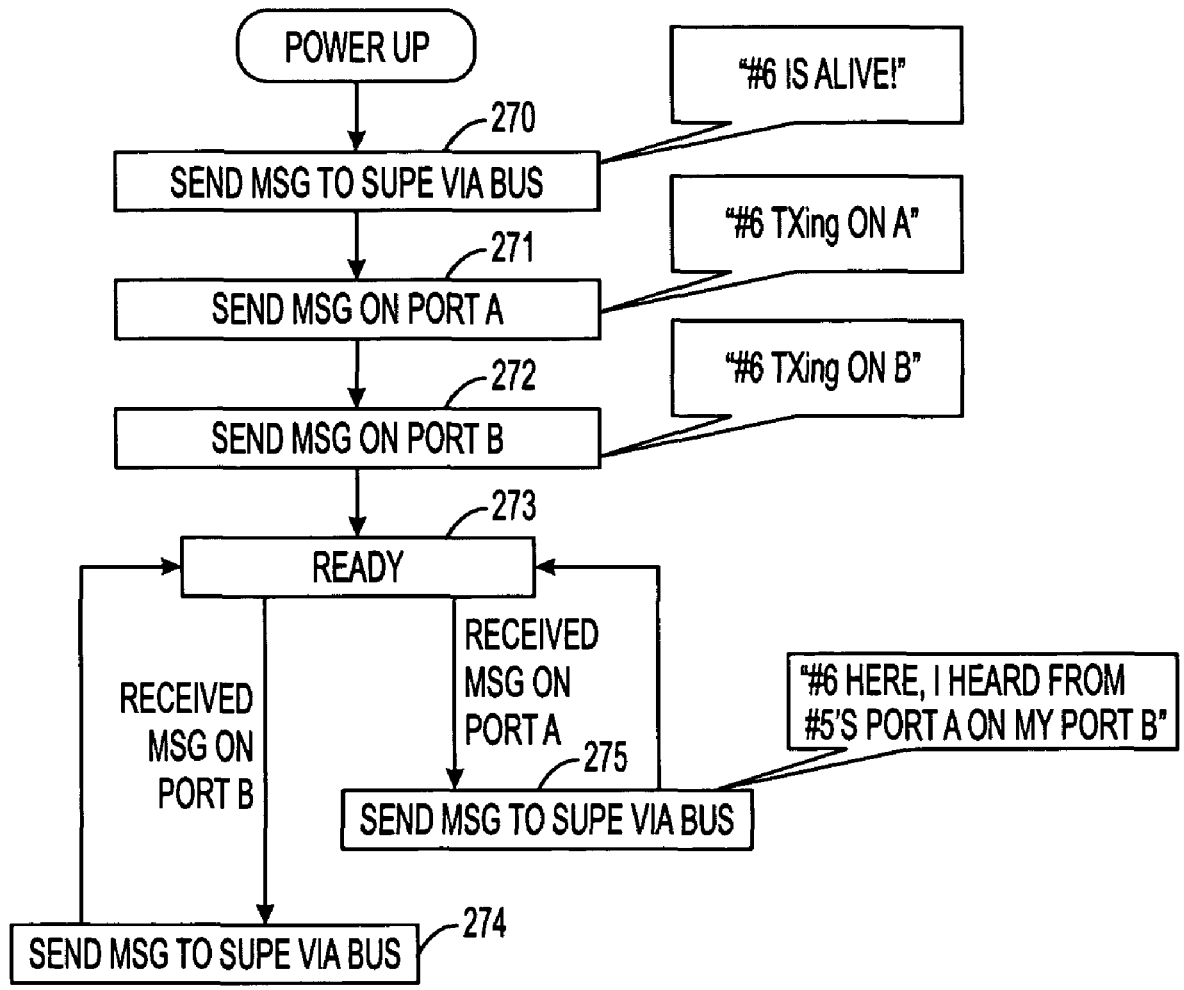
Figure 13C:
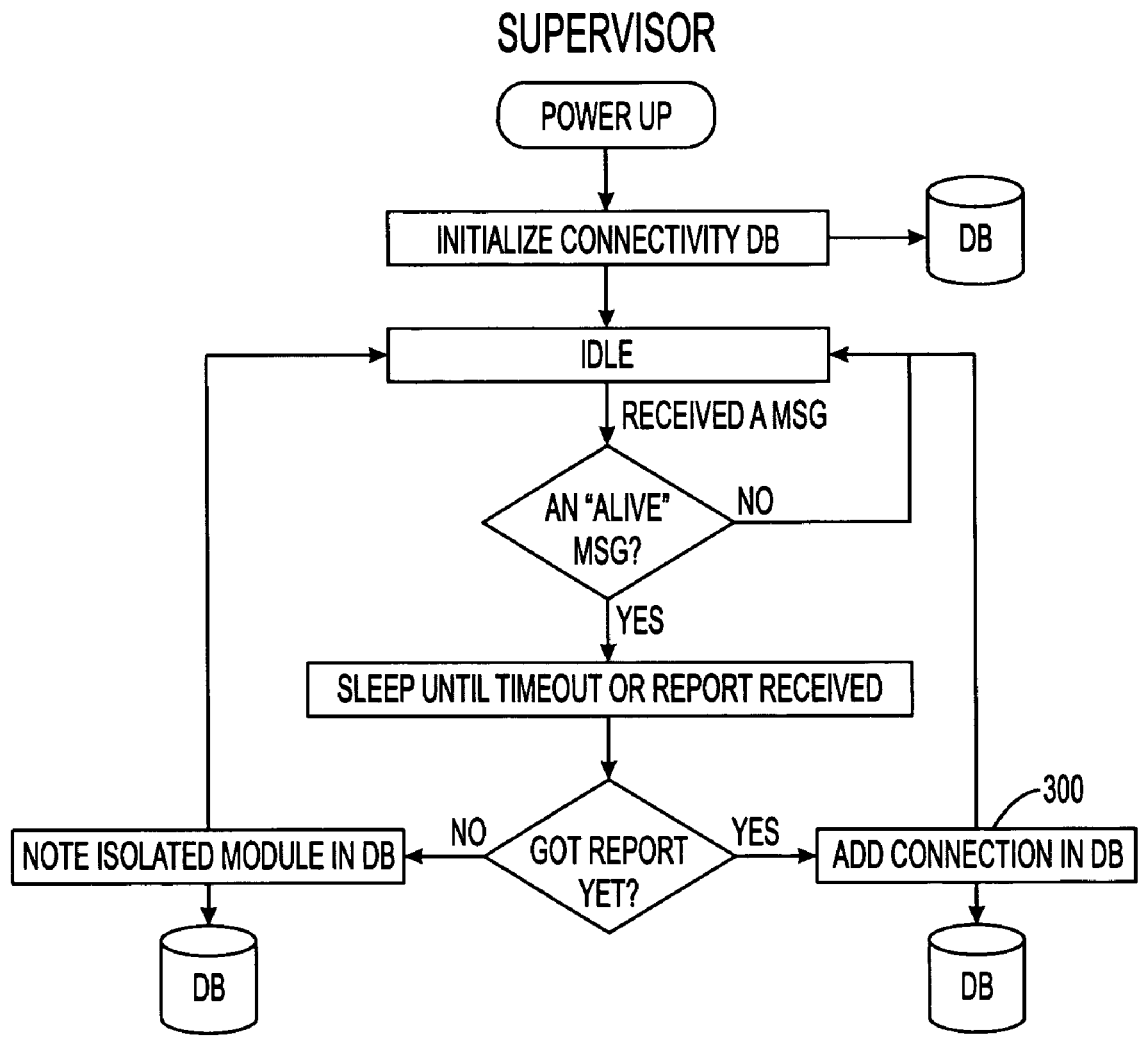

Next, in the case of a centralized parallel system, each module upon startup whether through a system-wide power-up or reset or by adding new modules, transmits a local message on each of its ports simultaneously. As shown in FIGS. 13A-13C, each module transmits a message at step 260, 270 which is received by the supervisory host as shown in FIG. 13C. The message preferably contains the identification of the transmitting module, and the local port number being transmitted on. All modules are always monitoring their local input ports. In that way, they will be able to receive message from neighboring modules. More particularly, for module 5 as shown in FIG. 13A, a message is sent on port A in step 261 and a message is sent on port B in step 262. Similarly, module 6 as shown in FIG. 13B transmits a message at step 271 on its port A and a message on port B in step 272. Again, each of the modules constantly monitors its own local port as shown in steps 263 and 273 in FIGS. 13A and 13B, respectively.

As each module monitors its own local port, it reports to the supervisory host 54 via the global bus 56 that they have just received a local communication. As shown in FIGS. 13A and 13B, module 5 reports to the supervisory host that it has received a message on port B at step 264 and that it has received a message on port A in step 265 while module 6 reports receiving a message on its port B in step 273 and reports receiving a message on its port A in step 275. Each report preferably contains at least four items of information including the identification of the new module, the identification of the module receiving the information, and the local port on which the new module transmitted and the local port on which the neighboring module received the information. In FIG. 13C, the supervisory host, upon receipt of such a report from a module adds the information to its connectivity data store in step 300. In addition to the above, if each module upon startup notifies the supervisory host 54 via the global bus 56 that it is active, then a subsequent lack of reports from any receiving modules indicates to the supervisory host that the module has no functioning neighbors. This too is information that is preferably added to the supervisory host data store.

A centralized parallel system of the type described above is shown in FIG. 12 in the space 250 at system C in the communication/control configuration plane 256.

Lastly, for example, the present application includes a distributed communication system topology having no global communication bus. Such a system is shown in the communication/control configuration plane 256 at system D.

In the distributed system, the method steps described above are executed with some required changes. First, the notification of the startup via the global bus is no longer applicable as, indicated above, a global bus is not provided. In the distributed communicated systems, each module communicates through active members and, when there is no continuous communication link between the module and the supervisory host, the message is not delivered.

Secondly, when a module wishes to report receipt of a local transmission, it then sends this report using local communications to one of its neighbors. That neighbor in turn forwards or relays the report to one of its neighbors, and so on until the message is eventually delivered to the supervisory host.

Each module is provided with means for forwarding messages received from neighboring modules to the supervisory host. Although this "multi-hopping" is a fairly intricate communication protocol, it has been described in the literature as understood by those skilled in the art. Briefly, however, an initial exploratory phase occurs where the supervisory host sends a route discovery message on each of its local communication interfaces. Each of the modules which receives this message notes, for future reference, the port on which they are connected to the supervisory host. Each of the modules in turn transmits a discovery message on all of its other local ports. The modules receiving this note will store information regarding the port through which they are indirectly connected to the supervisory host. This process repeats with any module receiving discovery messages on more than one of its local ports ignoring the latter ones to prevent cycles. After this process, each node recognizes and understands the direction to propagate messages in order to direct them to the supervisory host. The roadmap thereby acquired is updated dynamically as modules are added to and removed from the system. The details of updating the route map are not described herein but are available to those of ordinary skill in the art in the literature.

In the case that forwarded messages cannot be delivered because the reporting module is not connected even indirectly to the supervisory host, then that information is retransmitted once the host is reachable. Therefore, when a module which has previously reported receipt of a local message receives a discovery message, it then recognizes that a through path to the supervisory host has only just been established. At that time, the module retransmits the adjacency information previously collected. This, therefore, is a preferred method for updating the route map.

It is an advantage with this minimal architecture that an entire system configuration as well as the path link list is automatically generated and changed if any physical changes occur to the physical modular system such as if the system is recomposed into an alternative transport module set.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A configurable self-identifying workpiece transport system for moving an associated workpiece through a processing course, the workpiece transport system comprising:
   a plurality of modules disposed in selected positions relative to each other to define a plurality of processing paths, each of the plurality of modules having storage means for storing identification data specific to the module and each including a local communication circuit adapted to selectively execute a local communication process to communicate with adjacent other modules thereby developing, within a first set of communicating modules, connectivity data, wherein communication between adjacent modules of said first set of communicating modules during said local communication process is a proxy for a physical workpiece path therebetween and enables each of the plurality of modules to determine physical connections between adjacent modules in said transport system; and,
   at least one control processor including an automatic identification system in communication with each of the plurality of modules for retrieving from said first set of modules said identification data and said connectivity data developed from the local communication process between each of the plurality of modules and generating functional information about the workpiece transport system for use in moving said associated workpiece relative to the modules along said processing course.

2. The transport system according to claim 1 wherein:
said automatic identification system of said at least one control processor includes a capabilities processor for generating a module function table holding information associated with each of said plurality of modules in the transport system including said identification data and said connectivity data of each of said modules.

3. A configurable self-identifying workpiece transport system for moving an associated workpiece through a processing course, the workpiece transport system comprising:
a plurality of modules disposed in selected positions relative to each other to define a plurality of processing paths, each of the plurality of modules having storage means for storing identification data specific to the module and each including a local communication circuit adapted to selectively execute a communication process to communicate with adjacent other modules thereby developing, within a first set of communicating modules, connectivity data, wherein communication between adjacent modules of said first set of communicating modules during said communication process is a proxy for a physical workpiece path therebetween;
at least one control processor including an automatic identification system in communication with each of the plurality of modules for retrieving from said first set of modules said identification data and said connectivity data developed from the communication process between each of the plurality of modules and generating functional information about the workpiece transport system for use in moving said associated workpiece relative to the modules along said processing course, wherein said automatic identification system includes a link list processor for generating a link list table defining a physical connection between each of said plurality of modules in said transport system.

4. The transport system according to claim 3 wherein communication between adjacent modules during said local communication process enables each of the plurality of modules to dynamically determine physical connections between the modules by reporting the developed connectivity data to adjacent modules resulting in creation of a roadmap of the physical connections of said transport system.

5. The transport system according to claim 2 further including:
a storage for storing module capability data relating to functional capability of each of said modules, wherein said capabilities processor is configured to associate said module capability data with said identification data and said connectivity data in said module function table.

6. The transport system according to claim 5, wherein:
said storage is a database; and,
said capabilities processor is adapted to retrieve said capability data from said database by associating an index into said database with said identification data specific to each of said plurality of modules in the system, and integrate said retrieved capability data into said module function table.

7. The transport system according to claim 5, wherein:
said storage is a memory in each of said plurality of modules; and,
said capabilities processor is adapted to retrieve said capability data from said memories of each of said plurality of modules, and integrate said retrieved capability data into said module function table.

8. The transport system according to claim 1 wherein said local communication circuit includes photo optic devices.

9. The transport system according to claim 1 wherein said plurality of modules includes:
at least one workpiece functional unit configured to perform a selected operation on said association workpiece; and,
a plurality of transport modules disposed in said selected positions relative to said at least one workpiece functional unit.

10. The transport system according to claim 9 wherein each of said plurality of transport modules includes:
a frame assembly; and,
at least one of a director submodule on said frame assembly and a nip submodule on said frame assembly.

11. The transport system according to claim 10 wherein:
said at least one director submodule includes a director submodule circuit including a processor, a memory storing identification data and connectivity data of said director submodule, and a local communication circuit for communicating with adjacent other communication circuits of adjacent other modules; and,
said nip submodule includes a nip submodule circuit including a processor, a memory storing identification data and connectivity data of said nip submodule, and a communication circuit for communicating with other adjacent communication circuits of adjacent other modules.

12. The transport system according to claim 11 wherein each of said transport modules includes a circuit board on said frame assembly with electrical and mechanical connections to each of said director submodule circuits and said nip submodule transport module circuits for communicating said identification data and said connectivity data to a central control unit.

13. The transport system according to claim 1 further including:
a global system communication bus operatively connected with said plurality of modules and with said at least one control processor.

14. The transport system according to claim 13 wherein:
said at least one control processor is a central control unit operatively connected with said global system communication bus; and,
said automatic identification system is in operative communication with each of said plurality of modules through said global system communication bus for retrieving said identification data and said connectivity data from each of the plurality of modules.

15. The transport system according to claim 14 wherein said automatic identification system includes:
a capabilities processor in said central control unit for generating a module function table holding information associated with each of said plurality of modules in the transport system including identification data and connectivity data of each of said modules.

16. The transport system according to claim 15 wherein said automatic identification system includes a link list processor in said central control unit for generating a link list table enumerating physical and functional connections between each of said plurality of modules in said transport system.

17. The transport system according to claim 16 wherein said automatic identification system includes a sheet planning processor in said central control unit for generating a sheet itinerary table identifying a plurality of workpiece processing paths through said workpiece transport system.

18. The transport system according to claim 1 wherein said local communication circuits of said plurality of modules comprise a local system communication bus operatively connected with said plurality of modules and with said at least one control processor.

19. The transport system according to claim 18 wherein:
said at least one control processor is a distributed control system operatively connected with said local system communication bus and being distributed across said plurality of modules; and,
said automatic identification system is in operative communication with each of said plurality of modules through said local system communication bus for retrieving said identification data and said connectivity data from each of the plurality of modules.

20. The transport system according to claim 19 wherein said automatic identification system includes:
a capabilities processor in said distributed control system for generating a module function table holding information associated with each of said plurality of modules in the transport system including identification data and connectivity data of each of said modules.

21. The transport system according to claim 20 wherein said automatic identification system includes a link list processor in said distributed control for generating a link list table defining a physical and functional connection between each of said plurality of modules in said transport system.

22. The transport system according to claim 21 wherein said automatic identification system includes a sheet planning processor in said distributed control unit for generating a sheet itinerary table identifying a plurality of workpiece processing paths through said workpiece transport system.

23. A method of operating a configurable self-identifying workpiece transport system, the transport system for moving an associated workpiece through a processing course, the method comprising:
providing a plurality of modules, each of the plurality of modules having storage means for storing identification data specific to the module and each of the plurality of modules including a local communication circuit;
disposing the plurality of modules in selected positions relative to each other to define a plurality of processing paths;
selectively executing a local communication process by the plurality of modules to communicate with adjacent other modules thereby developing connectivity data within a first set of communicating modules, wherein communication between adjacent modules of said first set of communicating modules during said local communication process is a proxy for a physical workpiece path therebetween and enables each of the plurality of modules to determine physical connections between adjacent modules in said transport system;
providing at least one control processor means including an automatic identification system in communication with each of the plurality of modules;
using the automatic identification system of the at least one control processor, retrieving said identification data and said connectivity data developed from the local communication process; and,
generating, by the at least one control processor means, functional information about the workpiece transport system for use in moving said associated workpiece relative to the modules along said processing course.

24. The method according to claim 23 wherein the step of providing said at least one control processor means includes:
providing said automatic identification system of said at least one control processor means with a capabilities processor; and,
generating, with said capabilities processor, a module function table holding information associated with each of said first set of communicating modules in the transport system including said identification data and said connectivity data of each of said first set of communicating modules.

25. The method according to claim 24 wherein the step of providing said at least one control processor means includes providing said automatic identification system with a link list processor; and,
generating, with said link list processor, a link list table defining a physical connection between each of said plurality of modules in said transport system.

26. The method according to claim 25 wherein the step of providing said at least one control processor means includes providing said automatic identification system with a sheet planning processor; and,
generating a sheet itinerary table identifying a plurality of workpiece processing paths through said workpiece transport system.

27. The method according to claim 23 wherein:
the step of providing said plurality of modules includes:
providing at least one workpiece functional unit configured to perform a selected operation on said associated workpiece; and,
providing a plurality of transport modules disposed in said selected positions relative to said at least one workpiece functional unit; and,
the step of retrieving, with said automatic communication system includes:
retrieving identification data and connectivity data of said at least one workpiece functional unit.

28. The method according to claim 23 further including:
providing a global system communication bus operatively connected with said plurality of modules and with said at least one control processor means; and,
using said global system communication bus, retrieving said identification data and said connectivity data from each of the plurality of modules.

29. The method according to claim 28 wherein the step of providing said at least one control processor means includes providing a centralized control processor adapted to communicate with said plurality of modules through said global system communications bus.

30. The method according to claim 28 wherein the step of providing said at least one control processor means includes providing a distributed control processor selectively distributed across said plurality of modules, the distributed control processor being adapted to communicate with each of said plurality of modules directly and to self communicate through said global system communication bus.

31. The method according to claim 23 wherein the step of providing said plurality of modules, each with a local communication circuit, includes providing said local communication circuits of said plurality of modules configured as a local system communication bus operatively connected with said plurality of modules and with said at least one control processor means, the at least one control processor means being a distributed control system operative connected with said local system communication bus and being distributed across said plurality of modules; and,
using said local system communication bus with said automatic identification system being in operative communication with each of said plurality of modules, retrieving said identification data and said connectivity data from each of the plurality of modules.

32. The method according to claim 31 wherein the step of providing said at least one control processor means includes providing a centralized control processor adapted to communicate with said plurality of modules through said local system communications bus.

33. The method according to claim 31 wherein the step of providing said at least one control processor means includes providing a distributed control processor selectively distributed across said plurality of modules, the distributed control processor being adapted to communicate with each of said plurality of modules directly and to self communicate through said local system communication bus.

* * * * *